United States Patent
Kaizu et al.

(10) Patent No.: US 12,296,541 B2
(45) Date of Patent: May 13, 2025

(54) PACKAGING BAG AND MANUFACTURING SYSTEM THEREOF

(71) Applicant: KYORAKU CO., LTD., Kyoto (JP)

(72) Inventors: Masaru Kaizu, Niigata (JP); Hiroyuki Hayashi, Tokyo (JP); Masaaki Sueoka, Tokyo (JP); Shun Morioka, Tokyo (JP); Yosuke Muroya, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

(21) Appl. No.: 18/003,225

(22) PCT Filed: Jun. 21, 2021

(86) PCT No.: PCT/JP2021/023382
§ 371 (c)(1),
(2) Date: Dec. 23, 2022

(87) PCT Pub. No.: WO2021/261436
PCT Pub. Date: Dec. 30, 2021

(65) Prior Publication Data
US 2024/0286818 A1    Aug. 29, 2024

(30) Foreign Application Priority Data

Jun. 26, 2020  (JP) .................................. 2020-110971
Jul. 20, 2020  (JP) .................................. 2020-124023
(Continued)

(51) Int. Cl.
*B29C 65/78* (2006.01)
*B29C 65/20* (2006.01)
(Continued)

(52) U.S. Cl.
CPC .......... *B29C 65/7888* (2013.01); *B29C 65/20* (2013.01); *B29C 65/745* (2013.01);
(Continued)

(58) Field of Classification Search
CPC ........ B31B 2150/002; B31B 2150/001; B31B 2150/003; B31B 2150/10; B31B 2150/20;
(Continued)

(56) References Cited

U.S. PATENT DOCUMENTS 4,913,693 A * 4/1990 Ball ..................... B65D 33/065
493/239
5,860,743 A   1/1999 Larkin et al.
(Continued)

FOREIGN PATENT DOCUMENTS

JP    2000513684 A    10/2000
JP    2000327046 A    11/2000
(Continued)

OTHER PUBLICATIONS

International Search Report issued on Jul. 20, 2021, in corresponding International Application No. PCT/JP2021/023382, 5 pages.
(Continued)

*Primary Examiner* — Sameh Tawfik
(74) *Attorney, Agent, or Firm* — Maier & Maier, PLLC

(57) ABSTRACT

The present invention provides a manufacturing system of a packaging bag with excellent manufacturing efficiency. According to the present invention, provided is a manufacturing system of a packaging bag, including: a film supply device; a conveying device; a bottom insertion device; a bottom sealing device; a transverse sealing device; and a cutoff device, wherein the film supply device supplies a front surface long film and a back surface long film facing each other, the conveying device is configured to convey the front surface long film and the back surface long film, the bottom insertion device, the bottom sealing device, the transverse sealing device, and the cutoff device are arranged in this order along a conveyance direction, the bottom insertion device is configured to start inserting a bottom long film
(Continued)

between the front surface long film and the back surface long film at an insertion start position and to complete insertion of the bottom long film at an insertion completion position downstream from the insertion start position, the bottom sealing device is configured to weld the bottom long film to the front surface long film and to the back surface long film, the transverse sealing device forms a transverse seal portion extending in a direction perpendicular to the conveyance direction so as to weld the front surface long film and the back surface long film to each other, and the cutoff device cuts off the front surface long film, the back surface long film, and the bottom long film along the transverse seal portion.

4 Claims, 39 Drawing Sheets

(30) Foreign Application Priority Data

| | | | |
|---|---|---|---|
| Jul. 30, 2020 | (JP) | ................................. | 2020-129714 |
| Jul. 31, 2020 | (JP) | ................................. | 2020-130931 |
| Jul. 31, 2020 | (JP) | ................................. | 2020-130981 |

(51) Int. Cl.
| | |
|---|---|
| *B29C 65/74* | (2006.01) |
| *B65D 33/01* | (2006.01) |
| *B65D 75/00* | (2006.01) |
| *B65D 81/34* | (2006.01) |
| *B29L 31/00* | (2006.01) |
| *B31B 70/64* | (2017.01) |
| *B31B 150/00* | (2017.01) |
| *B31B 150/10* | (2017.01) |
| *B31B 150/20* | (2017.01) |

(52) U.S. Cl.
CPC ........... *B65D 33/01* (2013.01); *B65D 75/008* (2013.01); *B65D 81/3461* (2013.01); *B29L 2031/7128* (2013.01); *B31B 70/64* (2017.08); *B31B 2150/001* (2017.08); *B31B 2150/002* (2017.08); *B31B 2150/003* (2017.08); *B31B 2150/10* (2017.08); *B31B 2150/20* (2017.08)

(58) Field of Classification Search
CPC ......... B31B 70/64; B31B 70/10; B29C 65/20; B29C 65/745; B29C 65/7888
USPC .......................................................... 493/189
See application file for complete search history.

(56) References Cited

U.S. PATENT DOCUMENTS

| | | | | |
|---|---|---|---|---|
| 6,076,968 | A | 6/2000 | Smith et al. | |
| 6,077,208 | A | 6/2000 | Larkin et al. | |
| 6,164,825 | A | 12/2000 | Larkin et al. | |
| 6,425,847 | B1* | 7/2002 | Broenstrup | ............. B31B 70/00 493/197 |
| 7,331,917 | B2* | 2/2008 | Totani | ..................... B31B 70/00 493/379 |
| 8,414,465 | B2* | 4/2013 | Totani | ..................... B65D 31/10 493/243 |
| 8,579,780 | B2* | 11/2013 | Senbo | ..................... B31B 70/18 493/197 |
| 9,962,898 | B1* | 5/2018 | Russell | ................. B65D 75/008 |
| 10,189,608 | B2* | 1/2019 | Totani | ................... B65D 33/002 |
| 10,493,715 | B2* | 12/2019 | Totani | ..................... B31B 50/18 |
| 11,167,519 | B2* | 11/2021 | Totani | ..................... B65D 31/10 |

FOREIGN PATENT DOCUMENTS

| | | | |
|---|---|---|---|
| JP | 2005022741 A | | 1/2005 |
| JP | 2005178068 A | | 7/2005 |
| JP | 2005306426 A | | 11/2005 |
| JP | 2006298438 A | | 11/2006 |
| JP | 2013067393 A | | 4/2013 |
| JP | 2017071424 A | | 4/2017 |
| JP | 2018083640 A | | 5/2018 |
| JP | 2019001550 A | | 1/2019 |
| JP | 2019199259 A | | 11/2019 |

OTHER PUBLICATIONS

Office Action issued on Aug. 21, 2023, in corresponding Chinese Application No. 202180029226.2, 12 pages.
Office Action issued on Jan. 16, 2025, in corresponding Japanese Application No. 2020-110971, 43 pages.

* cited by examiner

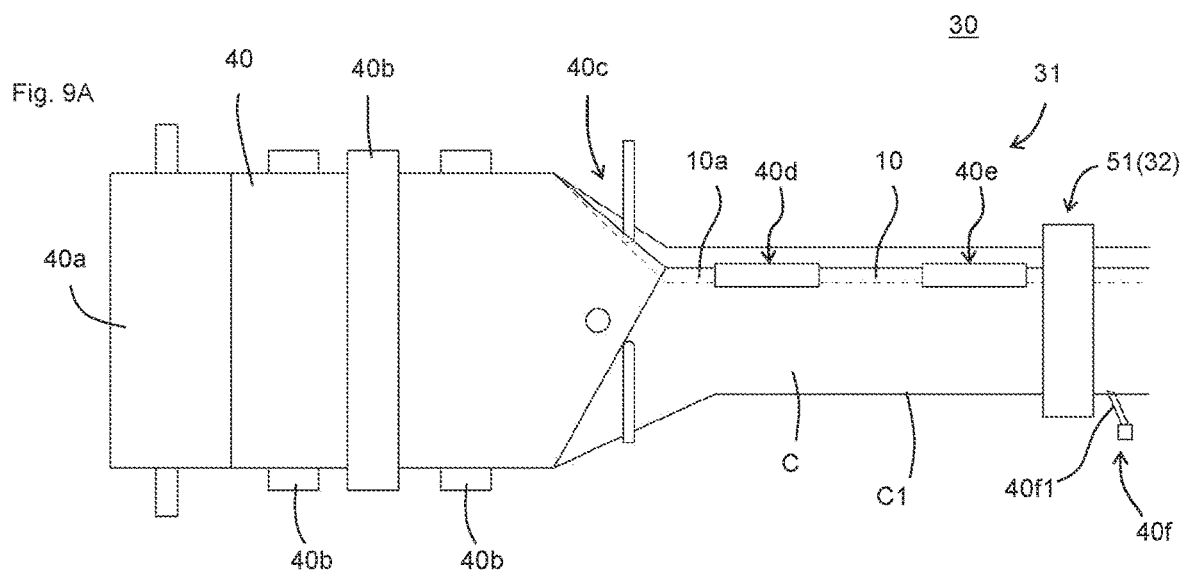
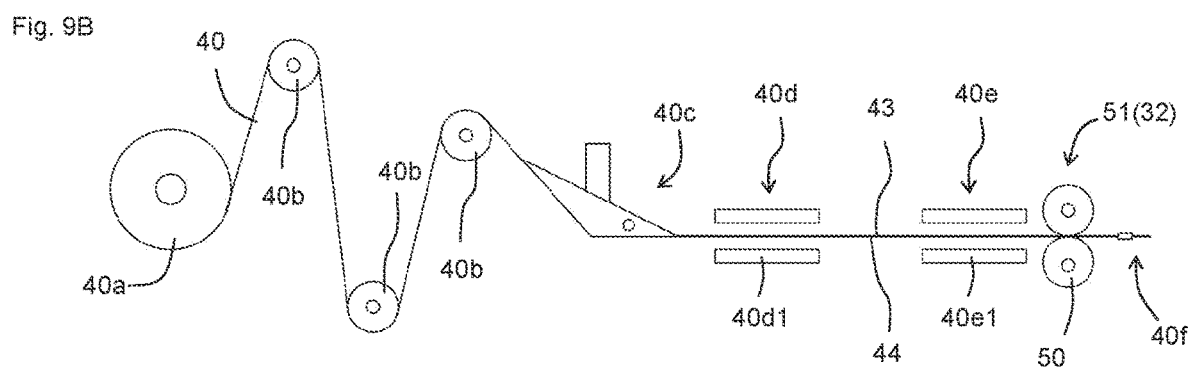

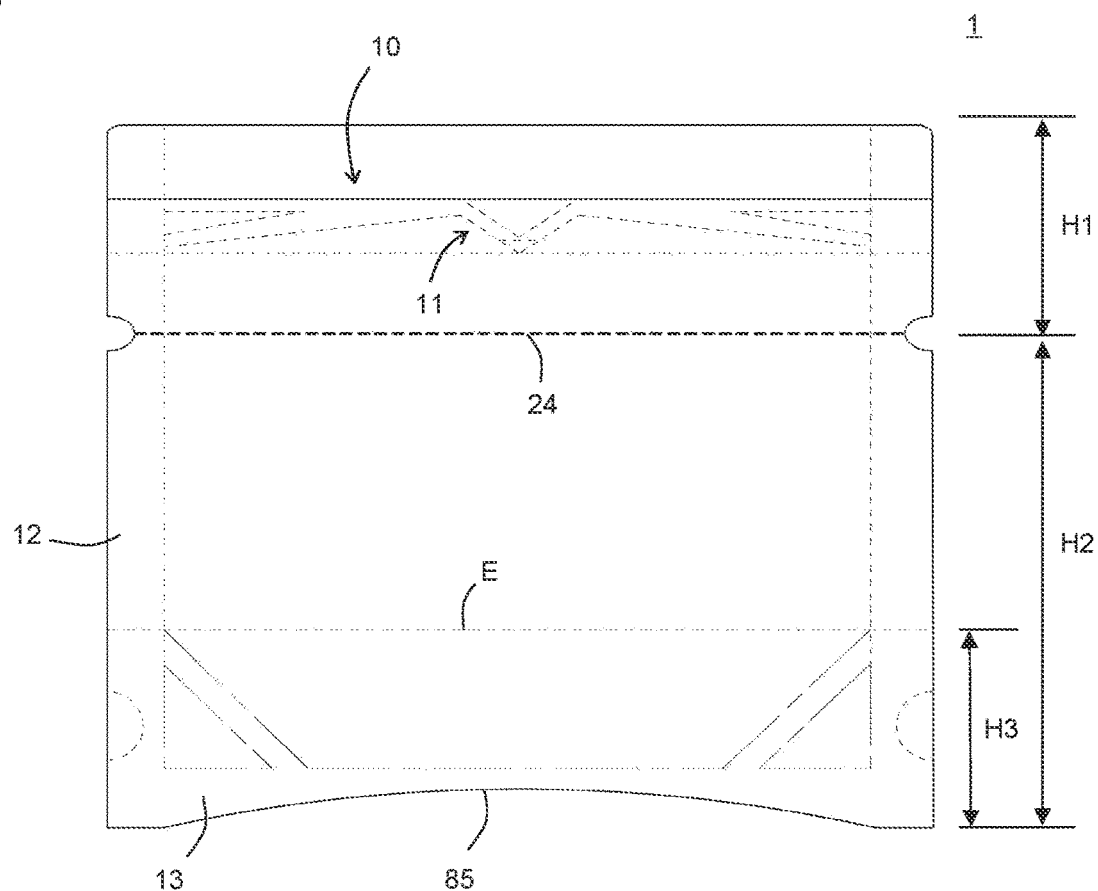

PACKAGING BAG AND MANUFACTURING SYSTEM THEREOF

TECHNICAL FIELD

The present invention relates to a self-standing packaging bag which is made of a flexible film formed into a bag shape and is for use in a microwave oven, and a manufacturing system thereof. The packaging bag of the present invention is suitable for applications where the bag is filled with contents, such as retort pouch food containing liquid, solid, or mixture thereof, and is heated in a microwave oven and the like.

BACKGROUND ART

First Viewpoint

Patent Literature 1 discloses a packaging bag configured by inserting a bottom surface film in a folded state between a front surface film and a back surface film whose edges are welded to each other, and by welding this bottom surface film to the front surface film and the back surface film.

Second to Fifth Viewpoints

Packaging bags filled with contents such as retort pouch food, etc., which can be heated in a freestanding state in a microwave oven, etc., are known. For example, the packaging bag of Patent Document 2 has excellent display effects in stores because of its self-standing stability.

CITATION LIST

Patent Literature

Patent Literature 1: JP-A-2000-327046
Patent Literature 2: JP-A-2005-306426

SUMMARY OF INVENTION

Technical Problem

First Viewpoint

A packaging bag with the configuration as disclosed in Patent Literature 1 requires welding the front surface film, the back surface film, and the bottom surface film to each other, which is time-consuming to manufacture.

The present invention has been made in view of such circumstances and provides a manufacturing system of a packaging bag with excellent manufacturing efficiency.

Second Viewpoint

On the other hand, there was room for improvement in the self-supporting stability of the type of packaging bag in which the front film and back film are welded at the side in the left-right direction, and the bottom is formed by opening the lower end of the center part widely in the front-back direction to make it self-supporting.

The purpose of this invention is to improve the self-supporting stability of a packaging bag that is made to stand on its own by forming the bottom part by opening the bottom end of the center part widely in the front-back direction.

Third Viewpoint

On the other hand, it is conceivable to use the container-like body portion obtained by excluding the cut-out portion above the opening portion as a tableware when eating the contents. In such a case, the opening of the opening section quickly closes, and there was room for improvement in terms of user convenience.

The present invention was made in view of these circumstances, and is to provide a microwave packaging bag that is highly convenient for users when used as tableware.

Fourth Viewpoint

On the other hand, it is conceivable to use the container-like body portion obtained by excluding the cut-out portion above the opening portion as a tableware when eating the contents. In such a case, it is difficult to open the package when it is opened.

The present invention was made in view of these circumstances, and is to provide a microwave oven packaging bag that is easy to open when opened and highly convenient for the user.

Fifth Viewpoint

On the other hand, it is conceivable to use the container-like body portion obtained by excluding the cut-out portion above the opening portion as a tableware when eating the contents. In such cases, it is sometimes difficult to grasp the packaging bag due to heating in a microwave oven, and there was room for improvement in terms of user convenience.

The present invention was made in view of these circumstances, and is to provide a packaging bag for microwave use that is easy for a user to grasp when used as a tableware.

Solution to Problem

First Viewpoint

According to the present invention, provided is a manufacturing system of a packaging bag, comprising: a film supply device; a conveying device; a bottom insertion device; a bottom sealing device; a transverse sealing device; and a cutoff device, wherein the film supply device supplies a front surface long film and a back surface long film facing each other, the conveying device is configured to convey the front surface long film and the back surface long film, the bottom insertion device, the bottom sealing device, the transverse sealing device, and the cutoff device are arranged in this order along a conveyance direction, the bottom insertion device is configured to start inserting a bottom long film between the front surface long film and the back surface long film at an insertion start position and to complete insertion of the bottom long film at an insertion completion position downstream from the insertion start position, the bottom sealing device is configured to weld the bottom long film to the front surface long film and to the back surface long film, the transverse sealing device forms a transverse seal portion extending in a direction perpendicular to the conveyance direction so as to weld the front surface long film and the back surface long film to each other, and the cutoff device cuts off the front surface long film, the back surface long film, and the bottom long film along the transverse seal portion.

According to the manufacturing system of the present invention, various steps necessary for manufacturing a packaging bag can be performed sequentially by various devices arranged along a film conveyance direction, and thus the packaging bag can be efficiently manufactured.

Hereinafter, various embodiments of the present invention will be exemplified. The embodiments shown below can be combined with each other.

Preferably, in the above-described manufacturing system, the bottom insertion device is configured to perform the insertion in a state where the bottom long film is folded in a V shape, and a distance between the insertion start position and the insertion completion position is 10 or more times longer than W, where W represents a width of the bottom long film in an unfolded state.

Preferably, in the above-described manufacturing system, the conveying device comprises a roller pair between the insertion start position and the bottom sealing device, the roller pair being configured to pinch the front surface long film and the back surface long film, and the roller pair is arranged so as not to pinch the bottom long film.

Preferably, in the above-described manufacturing system, the front surface long film comprises a joint portion formed by welding an overlapping portion where an inner surface of an upper front surface portion and an inner surface of a lower front surface portion are overlapped in a state that the upper front surface portion and the lower front surface portion are both folded back, the transverse sealing device comprises a plurality of seal bar pairs configured to pinch and weld the front surface long film and the back surface long film, and at least one of the plurality of seal bar pairs is configured to pinch a bottom region where the bottom long film is sandwiched between the front surface long film and the back surface long film and a joint region where the joint portion is formed, and is configured not to pinch an intermediate region between the bottom region and the joint region.

Second Viewpoint

According to the present invention, a flexible film is formed into a bag-shaped self-supporting packaging bag, said packaging bag having a bottom portion, a front portion and a back portion, said front portion and said back portion facing each other and rising from said bottom portion, said bottom portion, said front portion and said back portion being welded to each other to form said bag-shaped packaging bag. said packaging bag is welded together to form said bag shape, said packaging bag is configured so that at the lower end of the central portion, which is the lower end of the central portion in the left-right direction of said packaging bag, it opens more in the front-back direction than at the lower end of the side portions, which is the lower end of the side portions in the left-right direction, said packaging bag has a recessed portion at the lower end of said side portions, said recessed portion is in plan view, The packaging bag is provided wherein the receding portion is a portion receding upwardly with respect to a reference line along the edge of the lower end of the central portion, and wherein when the length of the packaging bag in the left-right direction at the lower end is L1 and the length of the receding portion in the left-right direction is L, L/L1≥0.05.

By this configuration, the portion of the packaging bag that extends in the front-back direction at the lower end of the packaging bag comes into contact with the surface on which the bag is placed, thereby improving the self-supporting stability of the packaging bag.

The following are various embodiments of the present invention.

Various embodiments of the invention are illustrated below. The embodiments shown below can be combined with each other.

Preferably, said length L1 and said length L further satisfy L/L1≤0.4.

Preferably, at the lower end of the side portion of said packaging bag, a fixing portion is provided to fix said front portion and said back portion in a front-back direction, and said receding portion is formed below said fixing portion.

Preferably, said receding portion is formed below said fixing portion so as not to interfere with said fixing portion.

Preferably, a bottom end welding portion is provided at the bottom end of said packaging bag to weld said bottom portion to said front portion and said bottom portion to said back portion, said bottom end welding portion having a center portion formed in a straight line in the center of said right and left directions and a slope portion formed with a slope upward from both ends of said center portion, said The value of the angle $\theta 1$ of the sloping portion relative to the upper end of the central portion is 30 degrees or more.

Preferably, said length L is L/L5≥0.5 relative to the length L5 from the boundary between said gradient portion and said central portion to the edge of said packaging bag.

Preferably, the packaging bag is further provided with a steam venting seal portion through which steam generated inside said packaging bag is discharged.

Third Viewpoint

According to the present invention, the packaging bag is a self-standing microwave oven packaging bag in which a flexible film is formed into a bag shape, said packaging bag having a bottom portion and a peripheral portion provided to rise from said bottom portion, said peripheral portion having an opening portion for opening said packaging bag and a reinforcement portion for maintaining the opening at said opening portion. The packaging bag is provided with an opening portion for opening the packaging bag and a reinforcing portion for maintaining the opening at the opening portion.

With this configuration, the opening of the opening is maintained by the reinforcing portion formed in the peripheral portion of the packaging bag, and the contents can be easily taken out. This improves user convenience when used as tableware.

Various embodiments of the invention are illustrated below. The embodiments shown below can be combined with each other.

Preferably, said reinforcing portion is a thermal history mark formed by applying thermal history to said peripheral portion.

Preferably, said peripheral surface portion has a front surface portion and a back surface portion facing each other, and said reinforcing portion is formed on at least one of said front surface portion and said back surface portion.

Preferably, said reinforcing portions are formed in said front or back portions in a line symmetrical manner with respect to the center line in the left-right direction.

Preferably, said reinforcing portion is formed to slope from a peripheral edge in said opening toward said center line.

Fourth Viewpoint

According to the present invention, a flexible film is formed into a pouch-shaped self-standing microwave oven packaging bag, said packaging bag having a bottom portion and a peripheral portion provided to rise from said bottom portion, said peripheral portion having a front portion and a back portion facing each other, said bottom portion, said front portion and said said packaging bag is configured so that at the lower center end, which is the lower end of the center portion of the packaging bag in the left-right direction, said packaging bag opens wider in the front-back direction than at the lower side end, which is the lower end of the side portion in the left-right direction, and said packaging bag has a recessed portion at the lower end of said center portion, and said recessed portion The packaging bag is provided with a receding portion at the lower end of the central portion, wherein the receding portion is, in plan view, a portion receding to the upper side relative to a reference line along the lower end of the side portion.

With this configuration, when the bag is opened, with both ends in the left-right direction at the lower end securely grounded, a load is applied to the center portion in the left-right direction at the lower end, and the ends in the left-right direction are inclined inwardly. As a result, the upper ends of the left-right direction ends are brought closer together, and the center portion in the left-right direction spreads back and forth. Thus, it is easier to open the package when opening it, and the convenience of the user is improved.

Various embodiments of the invention are illustrated below. The embodiments shown below can be combined with each other.

Preferably, said receding portion is formed in a curved shape.

Preferably, said receding portion is formed in a trapezoidal shape.

Preferably, if the length of said packaging bag in the left-right direction is L1 and the length of said receding portion in the left-right direction is L, then L/L1≥0.5.

Preferably, said peripheral portion is provided with an opening portion for opening said packaging bag, and when the length from the bottom edge of said packaging bag to said opening portion is H1 and the vertical length of said retracted portion is H, H/H1≥0.05.

Fifth Viewpoint

According to the present invention, a packaging bag for microwave oven use, in which a flexible film is formed into a bag shape, has a welding portion wherein said film is welded to each other, and a gripping portion provided outside said welding portion for a user to grasp said packaging bag, wherein the length from the inner edge of the welded portion to the outer edge of the gripping portion is 2 cm or more.

With this configuration, the gripping portion is provided on the outside of the welded portion, so that the gripping portion can be gripped even after the packaging bag is heated, etc. In other words, the gripping portion can be used as a tableware. In other words, a packaging bag that is easy for users to grasp when used as tableware is provided.

Various embodiments of the invention are illustrated below. The embodiments shown below can be combined with each other.

Preferably, said packaging bag has a bottom portion and a peripheral portion provided to rise from said bottom portion, said peripheral portion has a front portion and a back portion facing each other, said front portion and said back portion are welded with a pair of side end welding portions formed along the vertical direction, and said gripping portion is provided outside at least one of said pair of side end welding portions. The gripping portion is provided on the outside of at least one of the side end welding portions.

Preferably, if the length of said packaging bag in the left-right direction is L1 and the length of said gripping portion in the left-right direction is L, then L/L1≥0.1.

Preferably, said gripping portion is provided at the lower end of said packaging bag.

Preferably, if the length from the bottom end of the packaging bag to the opening portion is H2 and the length of the gripping portion in the vertical direction is H, then H/H2≥0.1.

BRIEF DESCRIPTION OF DRAWINGS

First Viewpoint

FIG. 9A shows a part of a manufacturing system 30 of the packaging bag 1 according to one embodiment of the present invention in a plan view.

FIG. 9B shows a part of the manufacturing system 30 of the packaging bag 1 according to one embodiment of the present invention in a front view.

Second Viewpoint

Figure 13A:
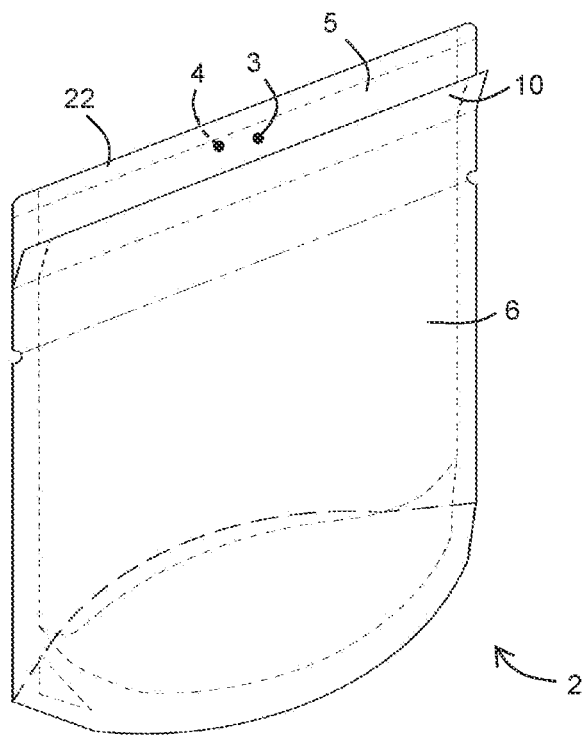
Figure 13B:
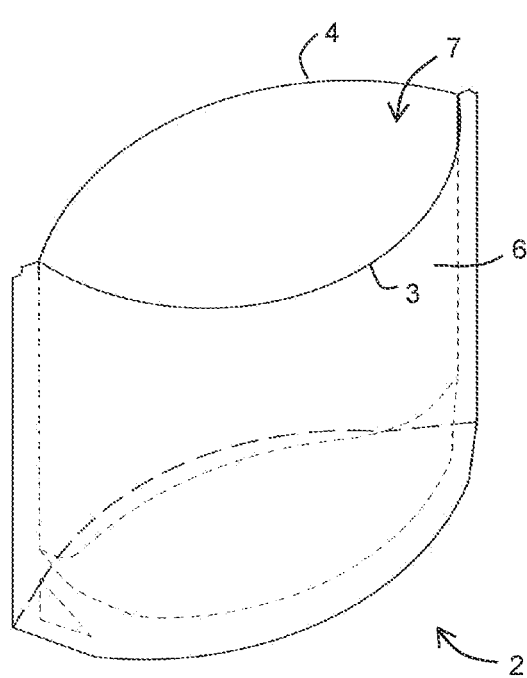

FIG. 13a is a diagonal view of the packaging bag 1 in its sealed state with the contents contained in the packaging bag 1 in this embodiment. FIG. 13b is a diagonal view of the packaging bag 1 in the opened state.

Figure 14:
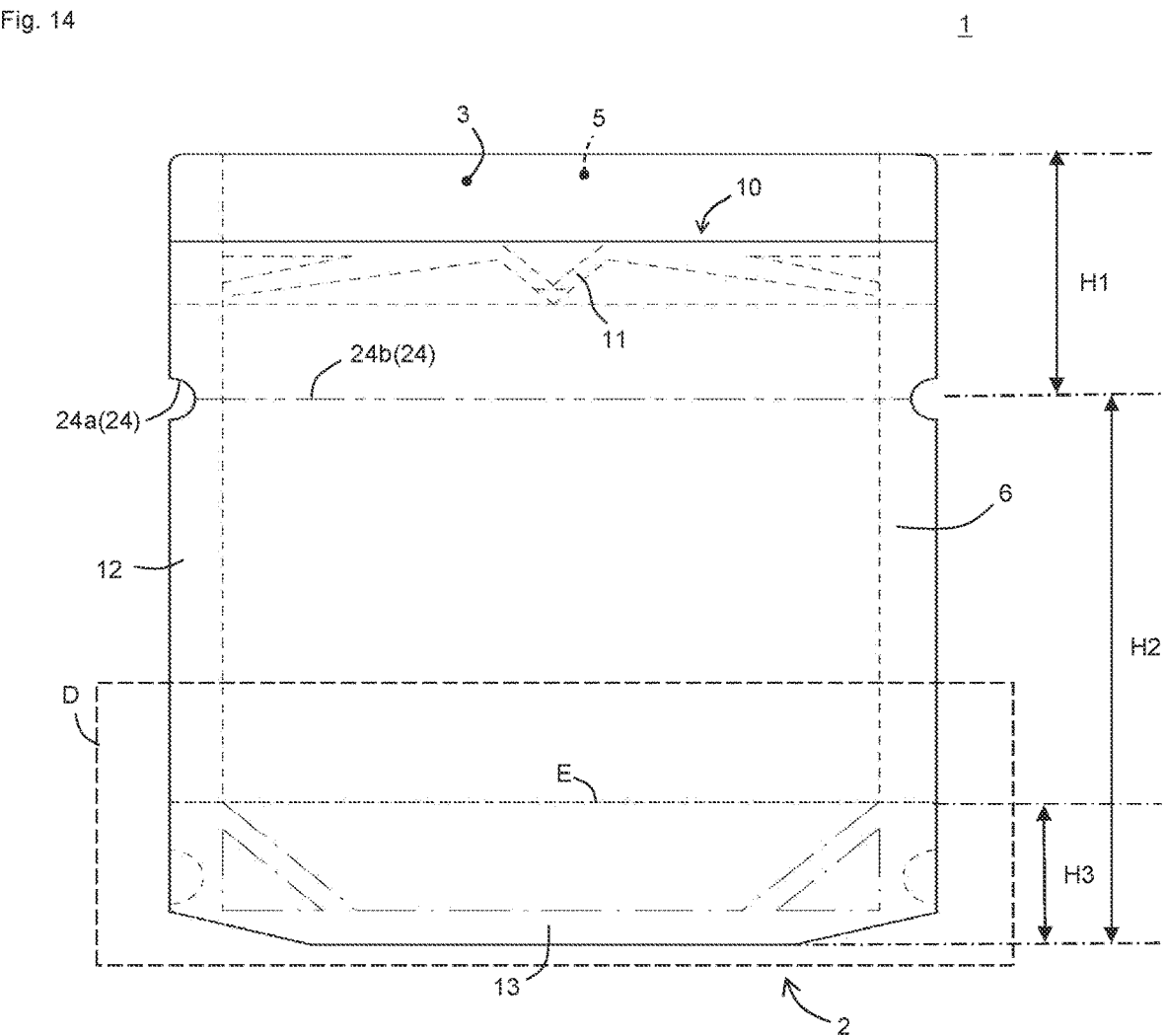

FIG. 14 shows the packaging bag 1 in plan view.

Figure 15A:
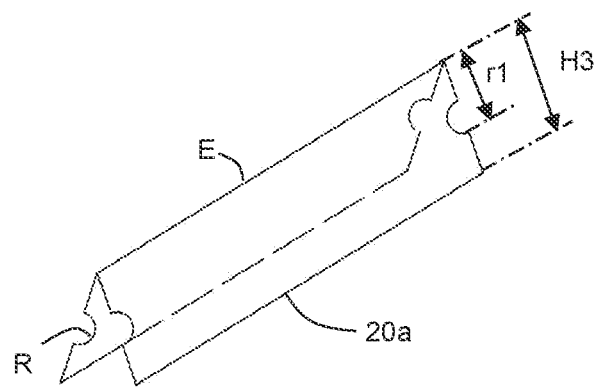
Figure 15B:
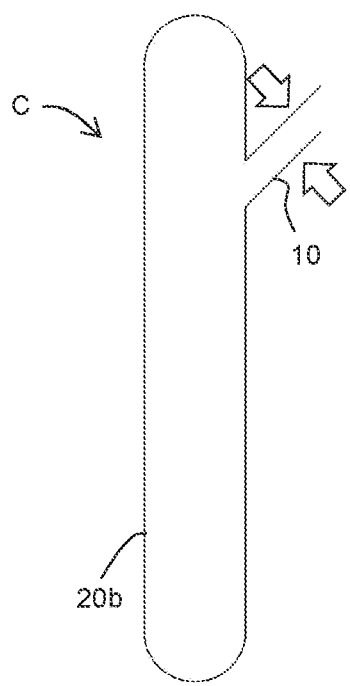

FIG. 15a is a diagonal view of the bottom film 20a, which constitutes the bottom portion 2. FIG. 15B is a side view of the peripheral wall film 20B.

Figure 16A:
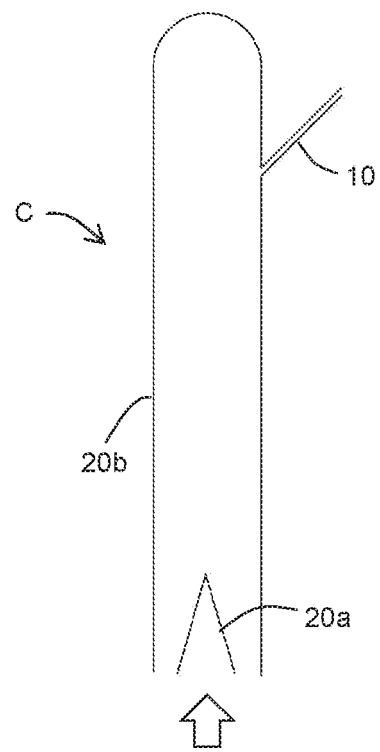
Figure 16B:
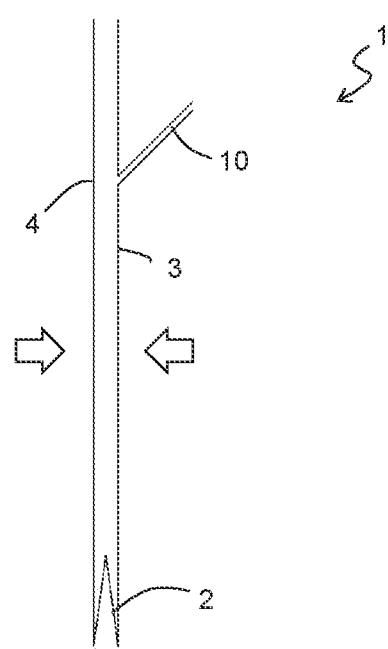

FIG. 16a is a view of a portion of the peripheral wall film 20b cut and the bottom film 20a inserted at the cut point. FIG. 16B shows how the peripheral wall film 20B and bottom film 20A are welded together to produce packaging bag 1.

Figure 17A:
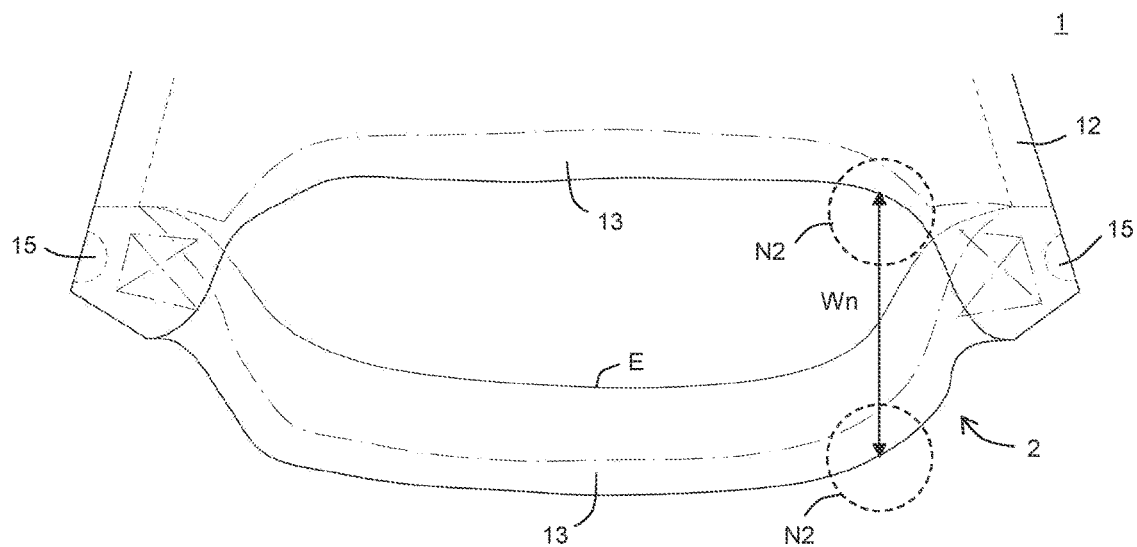
Figure 17B:
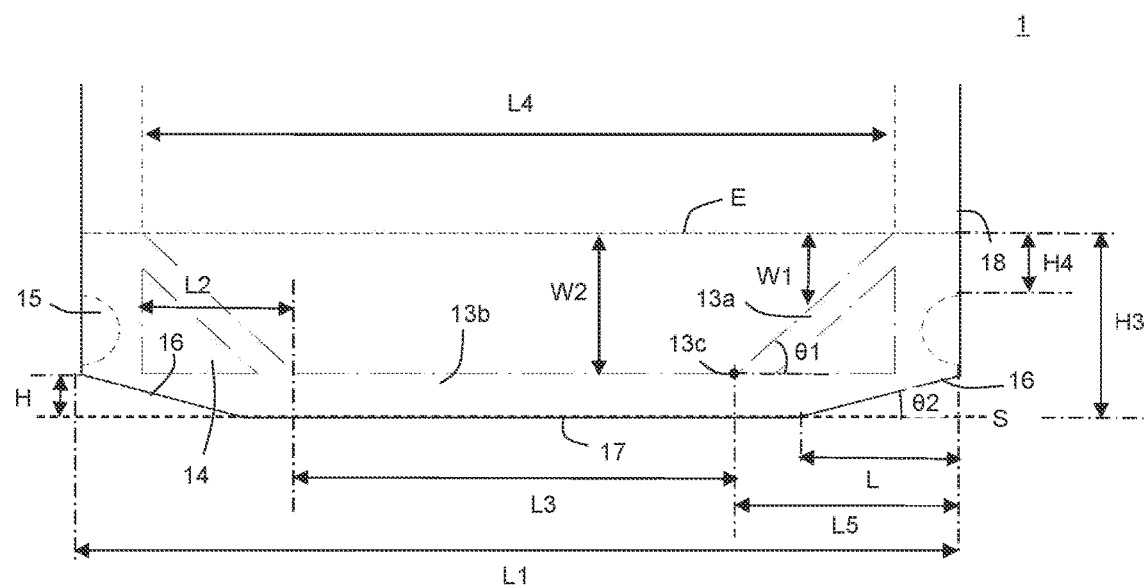

FIG. 17a is an enlarged view of the bottom portion 2 with the bottom edge of the center portion opened wide in the front-back direction. FIG. 17B is an enlarged view of area D in FIG. 14.

Figure 18A:
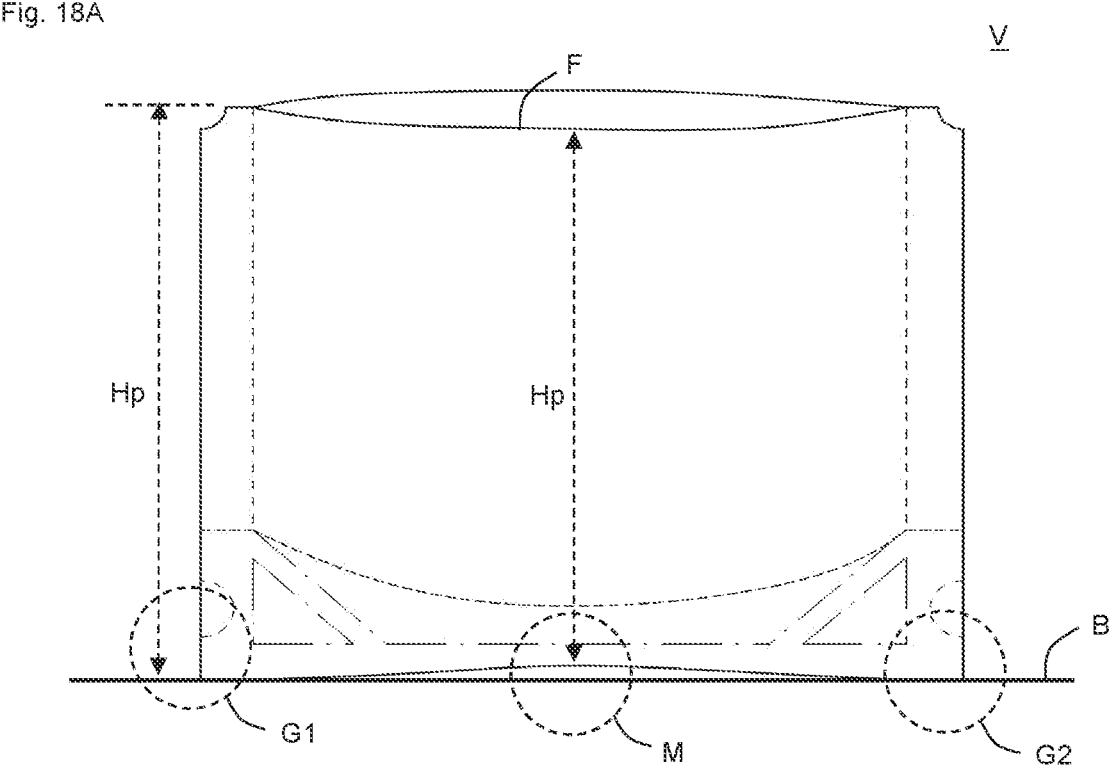
Figure 18B:
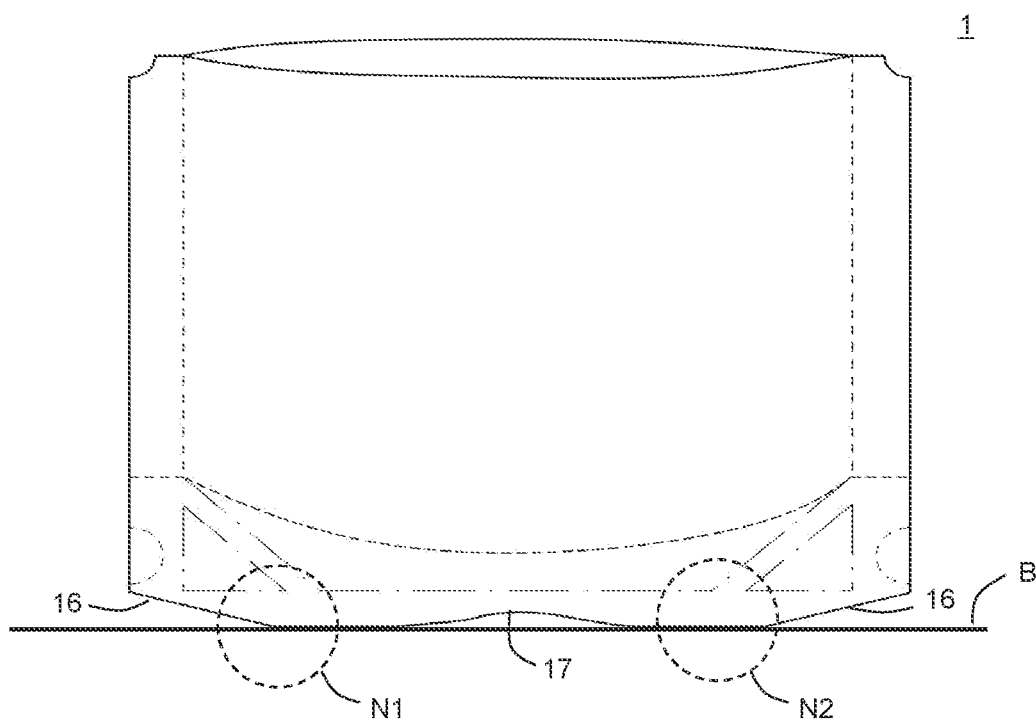

FIG. 18a shows the packaging bag V as a comparative example, placed on the placing surface B with the bag opened. FIG. 18B shows the packaging bag 1 placed on the placing surface B with the bag opened.

Third Viewpoint

Figure 19A:
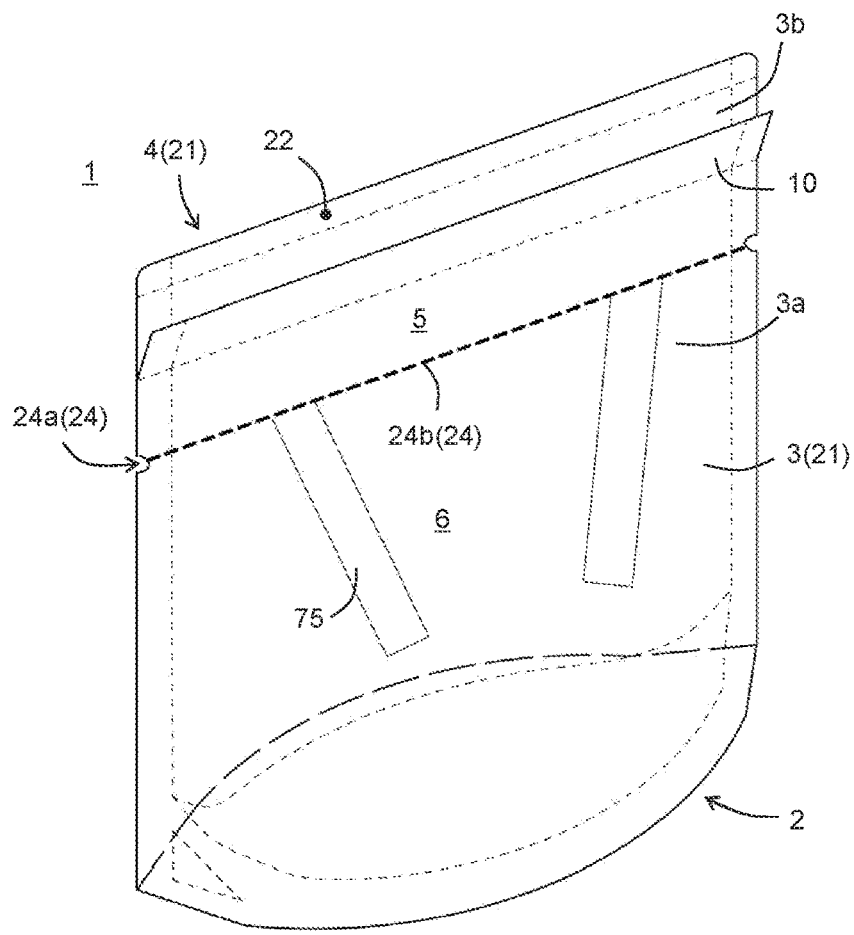
Figure 19B:
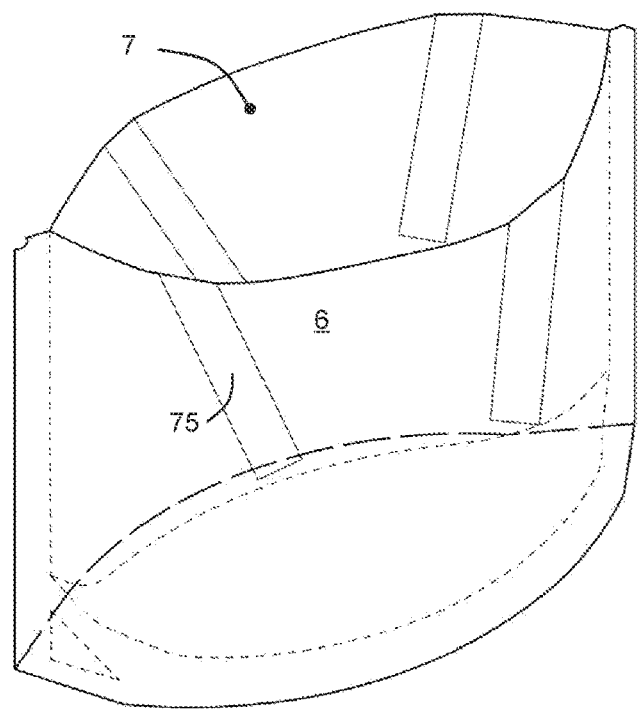

FIG. 19A is a diagram of the first embodiment of the packaging bag 1 with the contents contained within. FIG. 19B is a diagonal view of the packaging bag 1 in the opened state.

Figure 20:
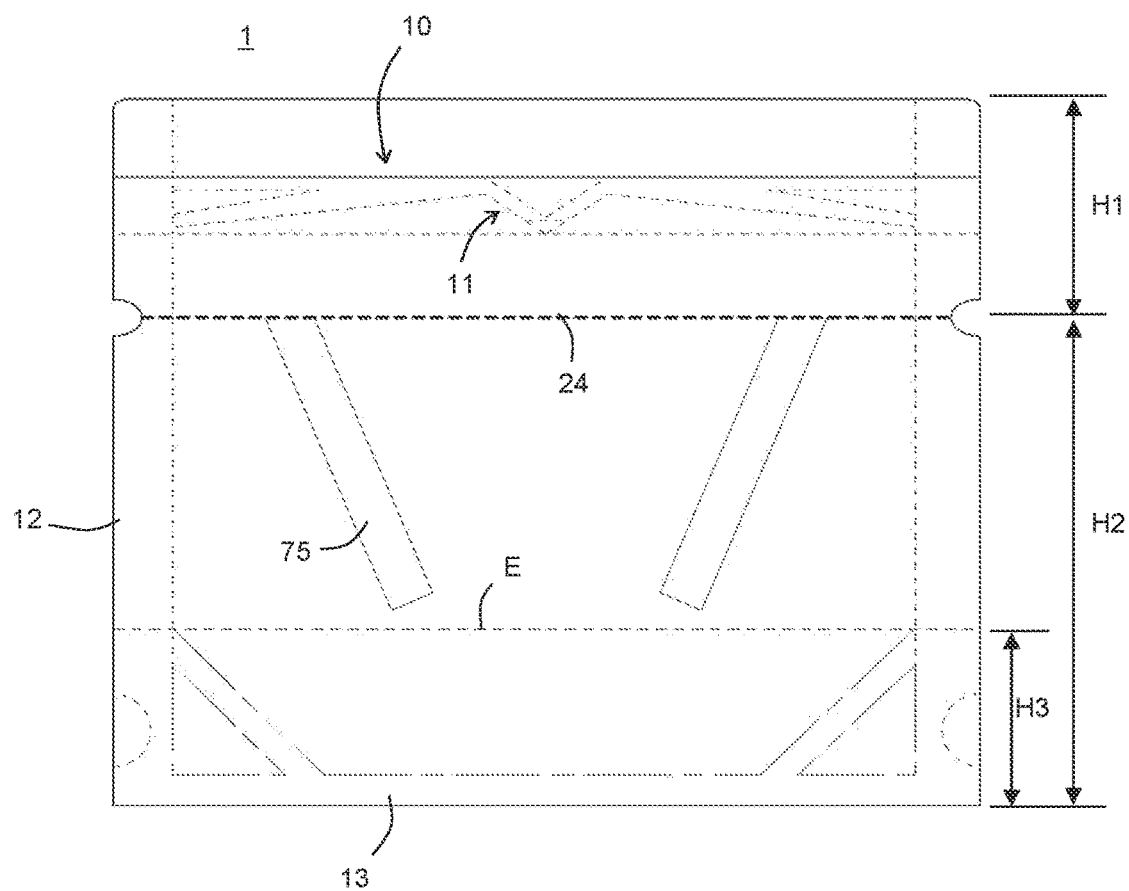

FIG. 20 shows the packaging bag 1 of FIG. 19 in plan view.

Figure 21A:
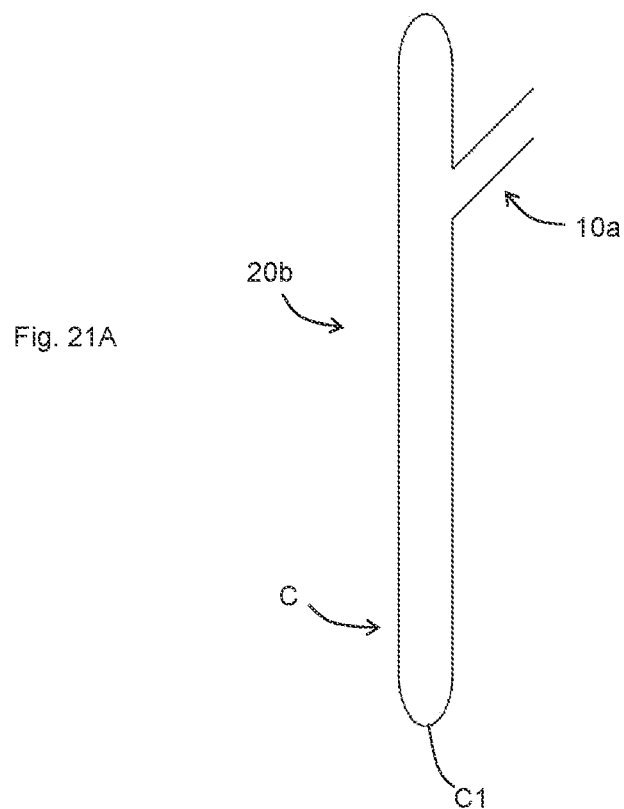
Figure 21B:
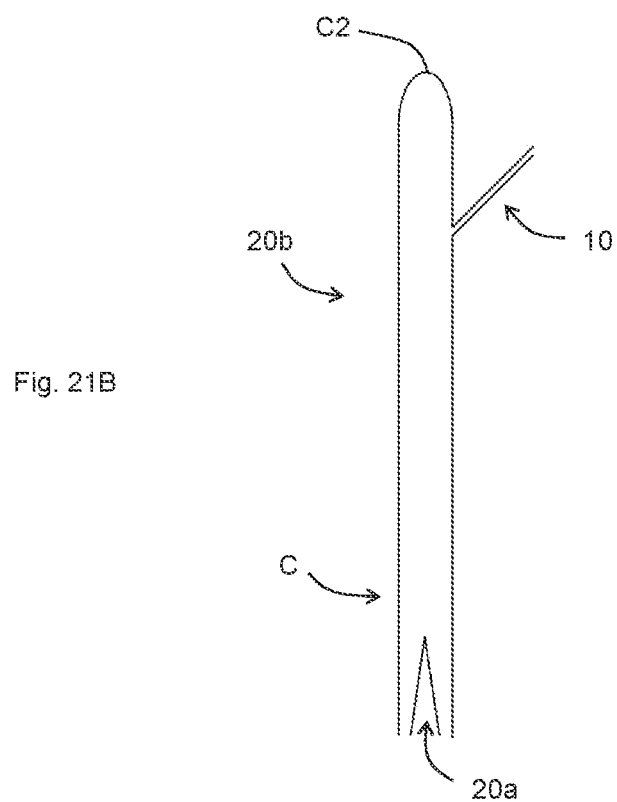

FIG. 21a is a side view of the peripheral wall film 20b. FIG. 21B shows the state in which a portion of the peripheral wall film 20B is cut and the bottom film 20A is inserted at the cut point.

Figure 22A:
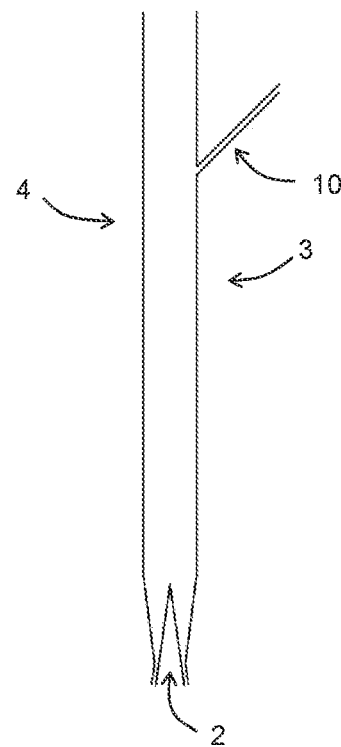
Figure 22B:
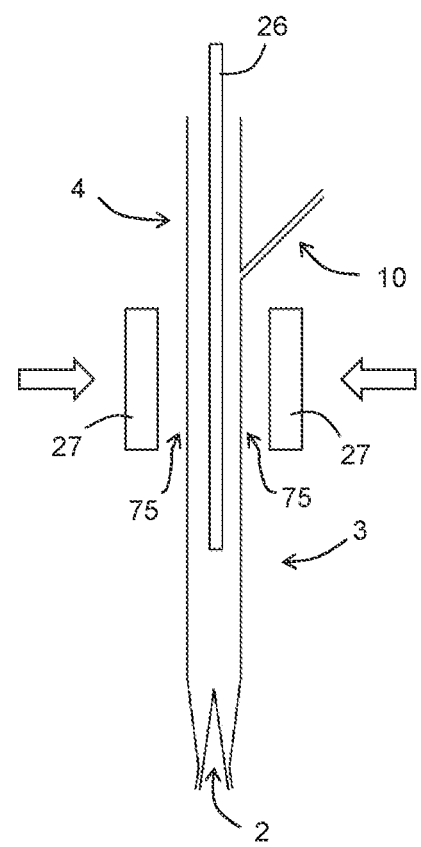

FIG. 22a shows how the peripheral wall film 20b and bottom film 20a are welded together to produce packaging bag 1. FIG. 22b shows how cushioning material 26 is inserted between front portion 3 and back portion 4 and thermal history is applied.

Figure 23A:
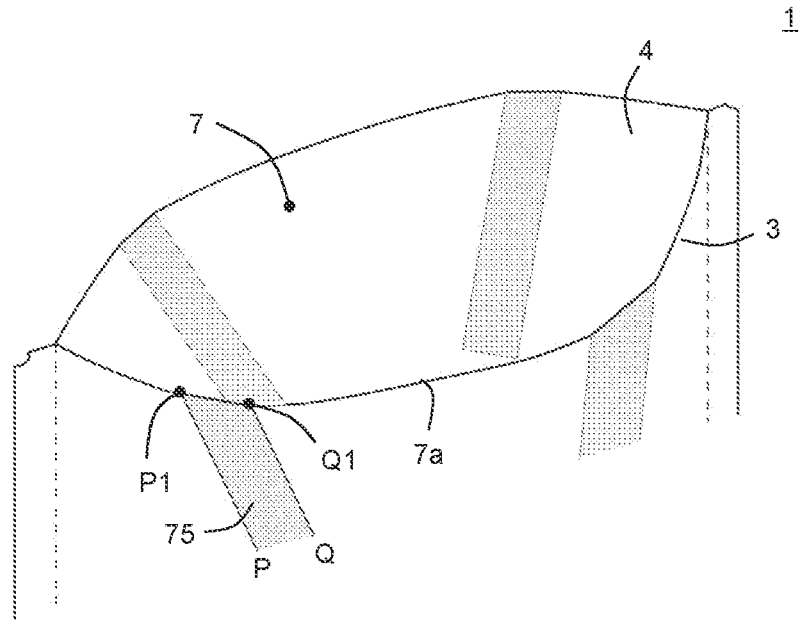
Figure 23B:
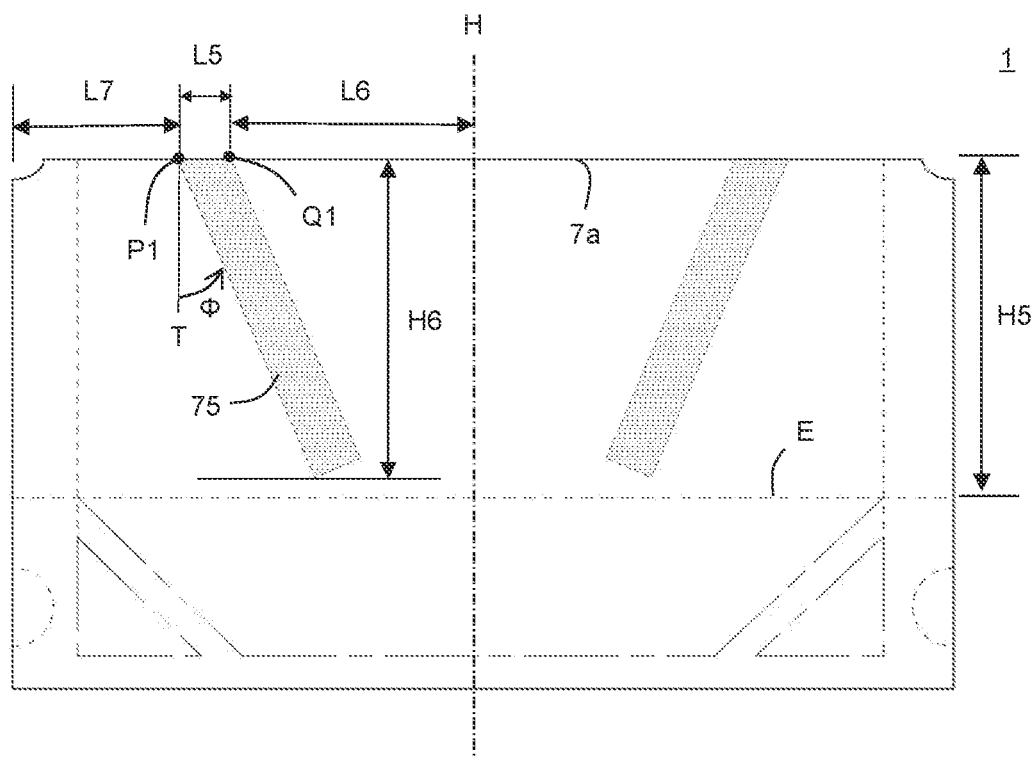

FIG. 23a is an enlarged view of the opening 7 of the packaging bag 1 with the lower end of the center portion of the bag 1 opened wide in the front-back direction. FIG. 23B is a detailed view of the main body 6.

Figure 24:
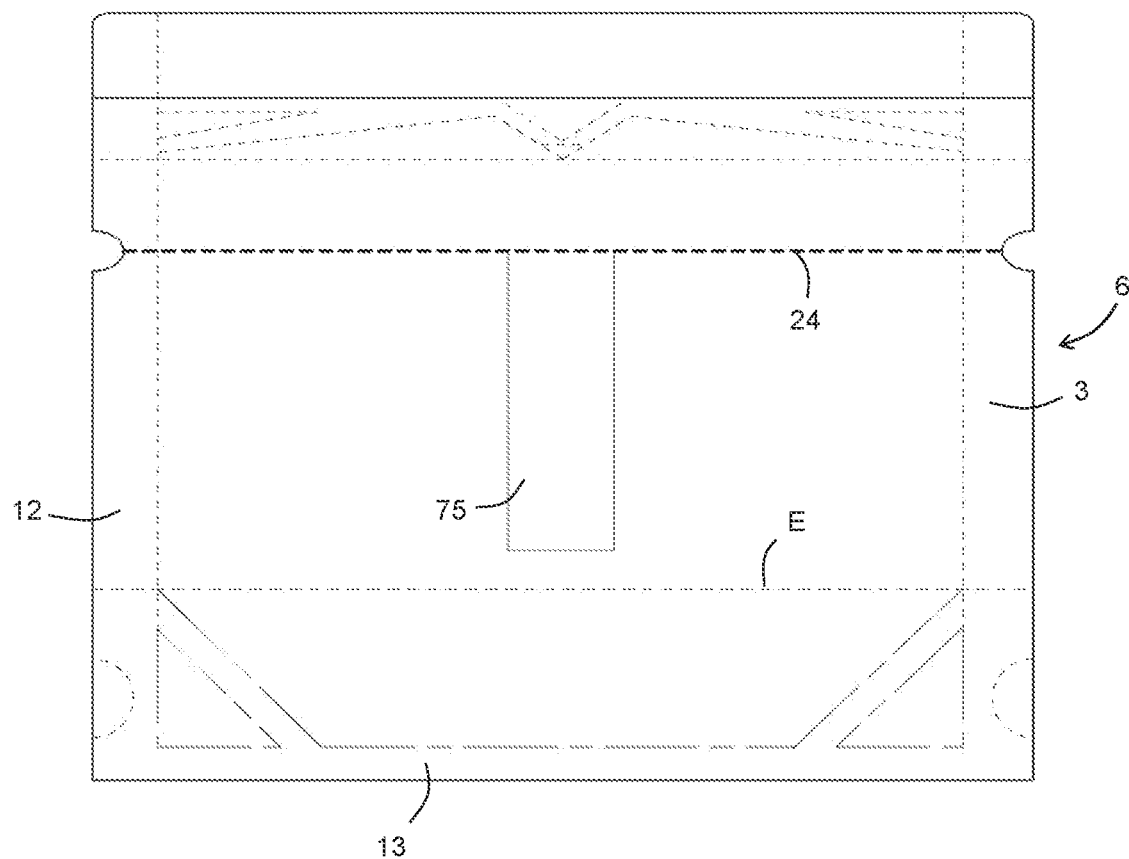

FIG. 24 shows the packaging bag 1 of the second embodiment in plan view.

Figure 25:
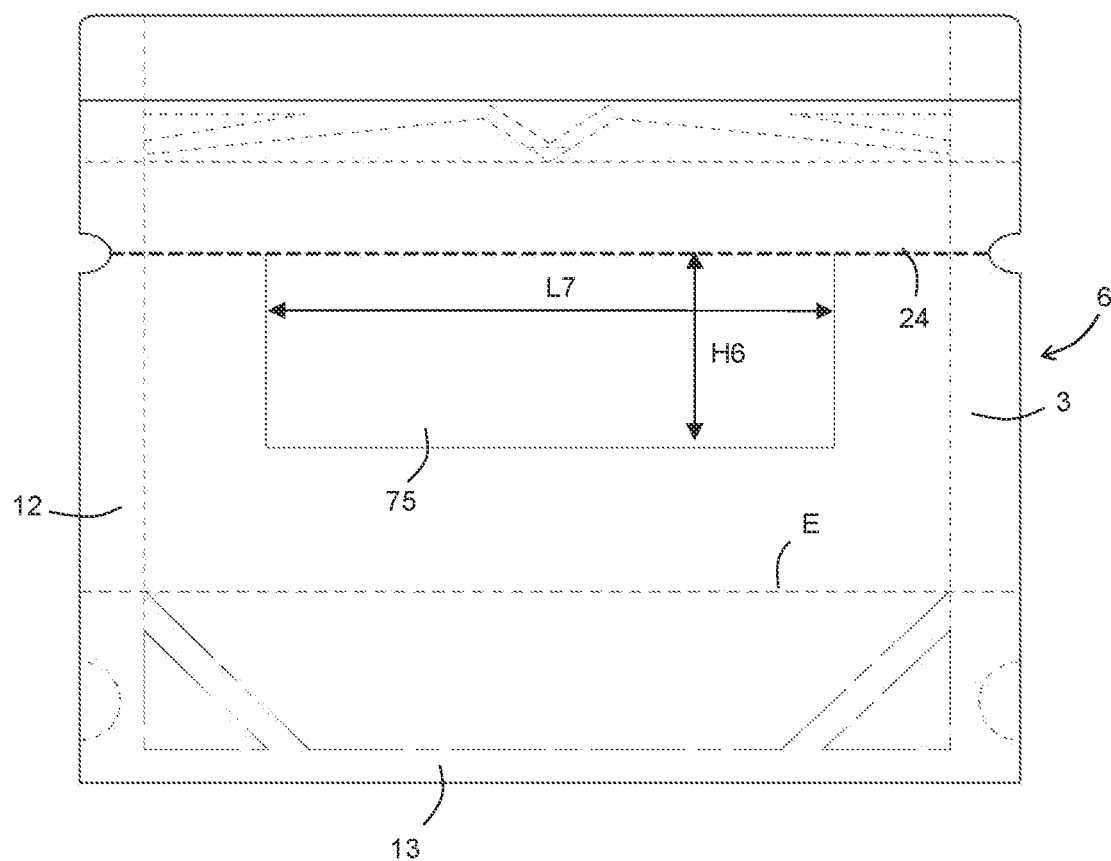

FIG. 25 shows the packaging bag 1 of the third embodiment in plan view.

Figure 26:
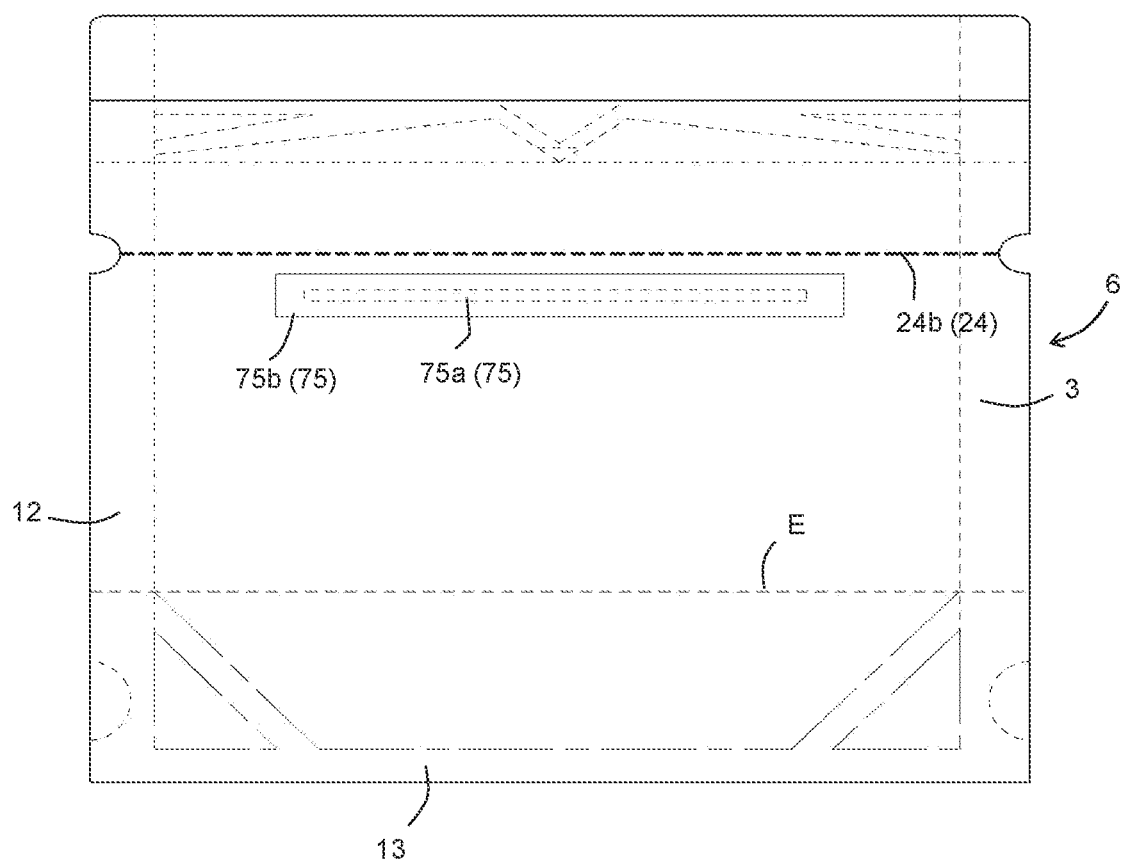

FIG. 26 shows the fourth embodiment of the packaging bag 1 in plan view.

Fourth Viewpoint

Figure 27A:
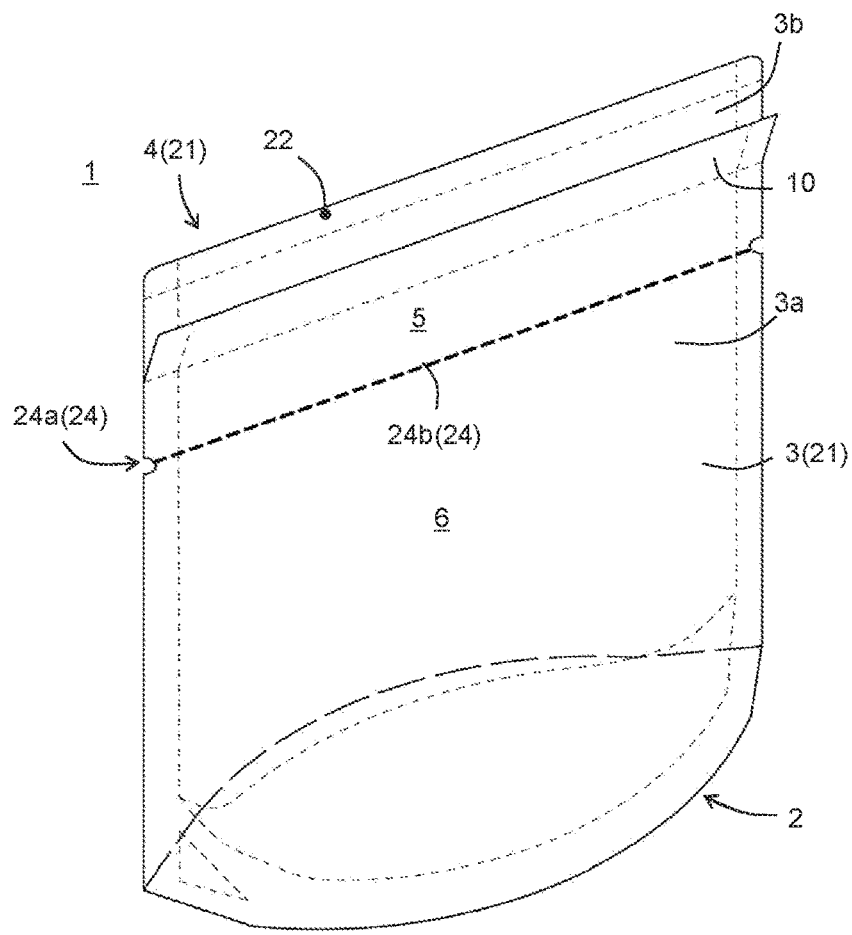
Figure 27B:
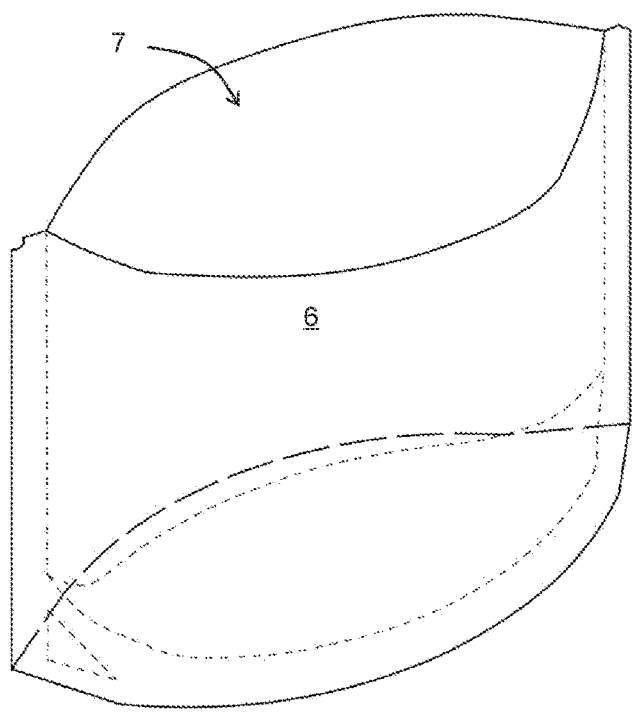

FIG. 27a is a diagram of the first embodiment of the packaging bag 1 with the contents contained within. FIG. 27b is a diagram of the packaging bag 1 in the opened state.

FIG. 28 shows the packaging bag 1 of FIG. 27 in plan view.

Figure 29A:
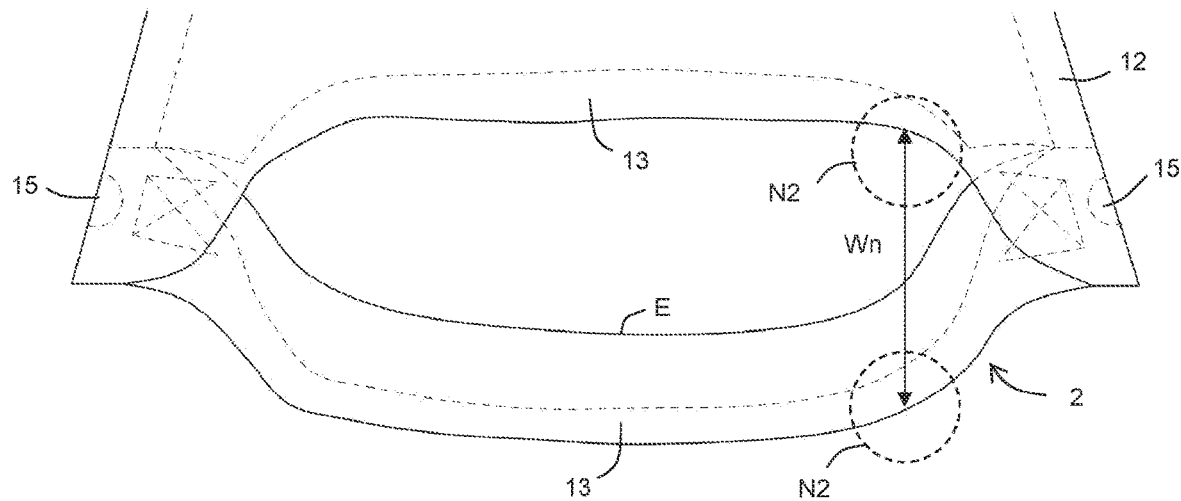
Figure 29B:
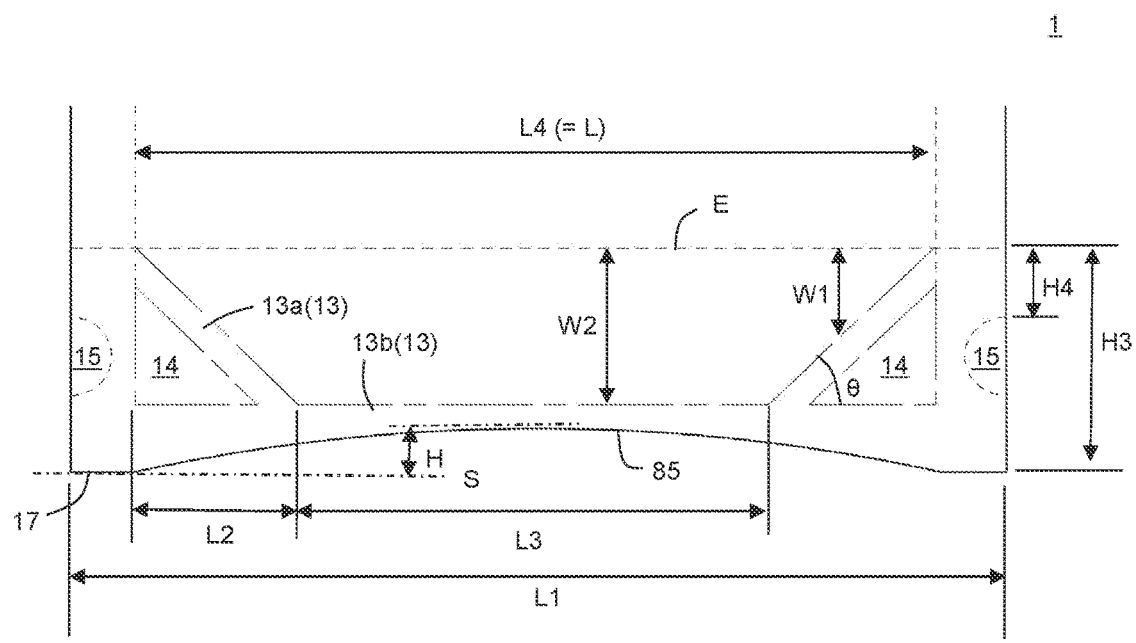

FIG. 29a is an enlarged view of the bottom portion 2 of the packaging bag 1 in a state in which the bottom end of the center portion of the packaging bag 1 is opened wide in the front-back direction. FIG. 29B is a detailed view of the area near the bottom end of the packaging bag 1 of FIG. 28.

Figure 30A:
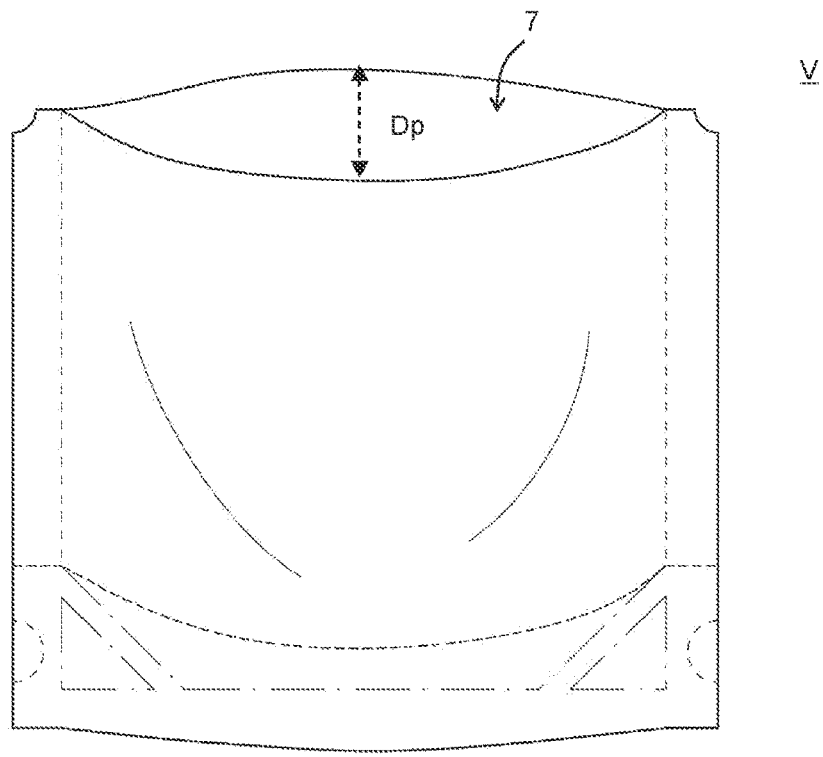

FIG. 30a is a diagram of packaging bag V as a comparative example in an opened state.

Figure 30B:
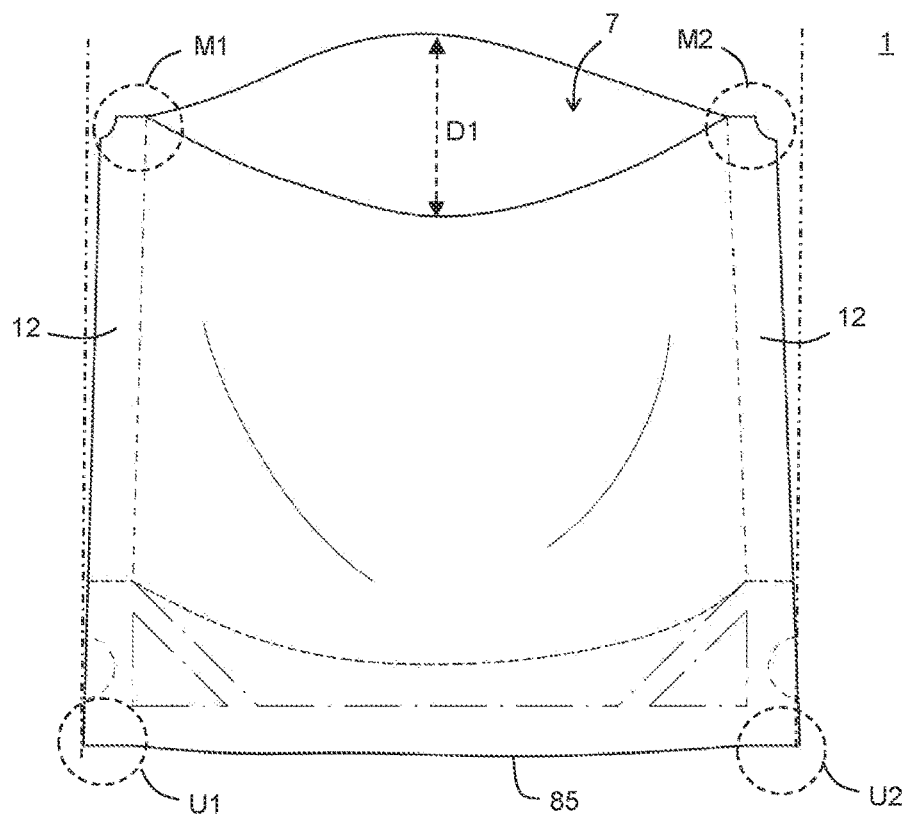

FIG. 30B is a diagonal view of the packaging bag 1 in the opened state.

Figure 31:
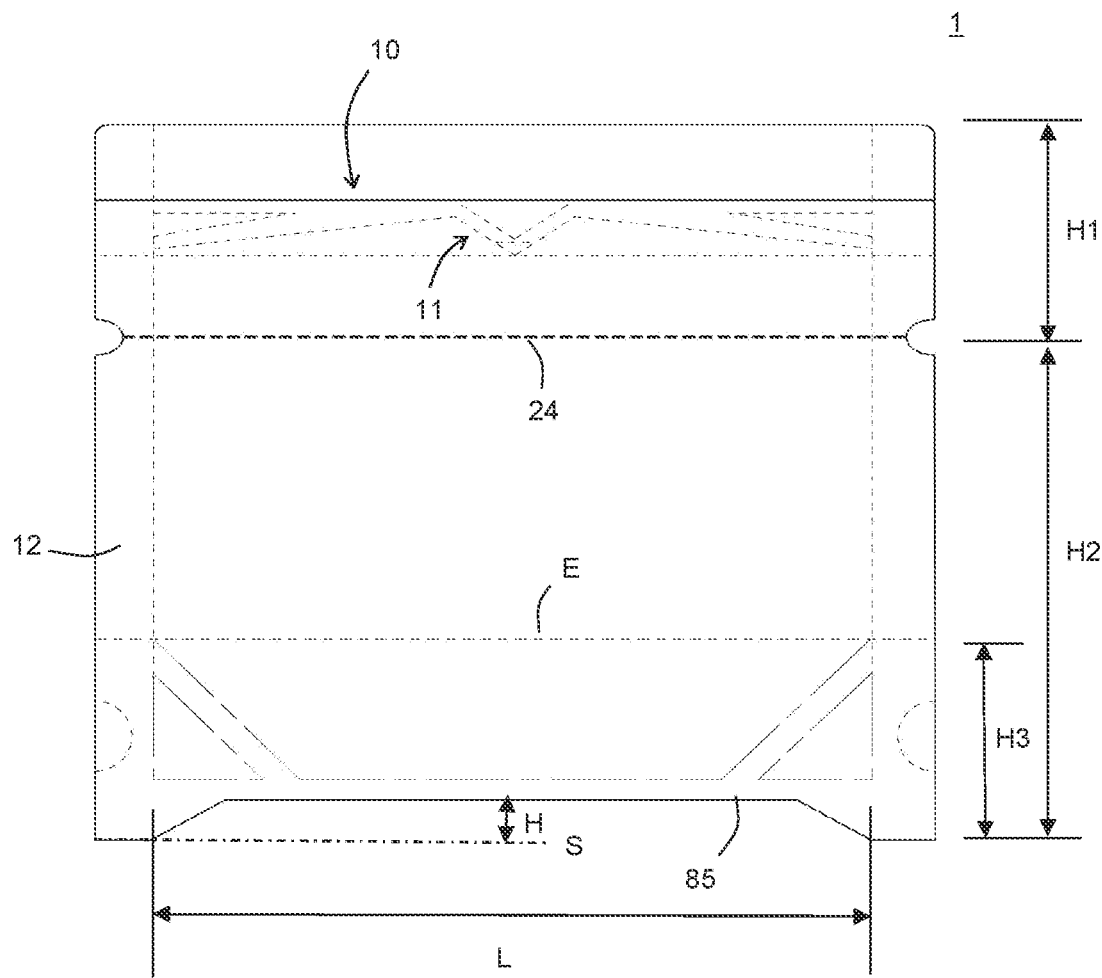

FIG. 31 is a plan view of the packaging bag 1 of the second embodiment.

Fifth Viewpoint

Figure 32:
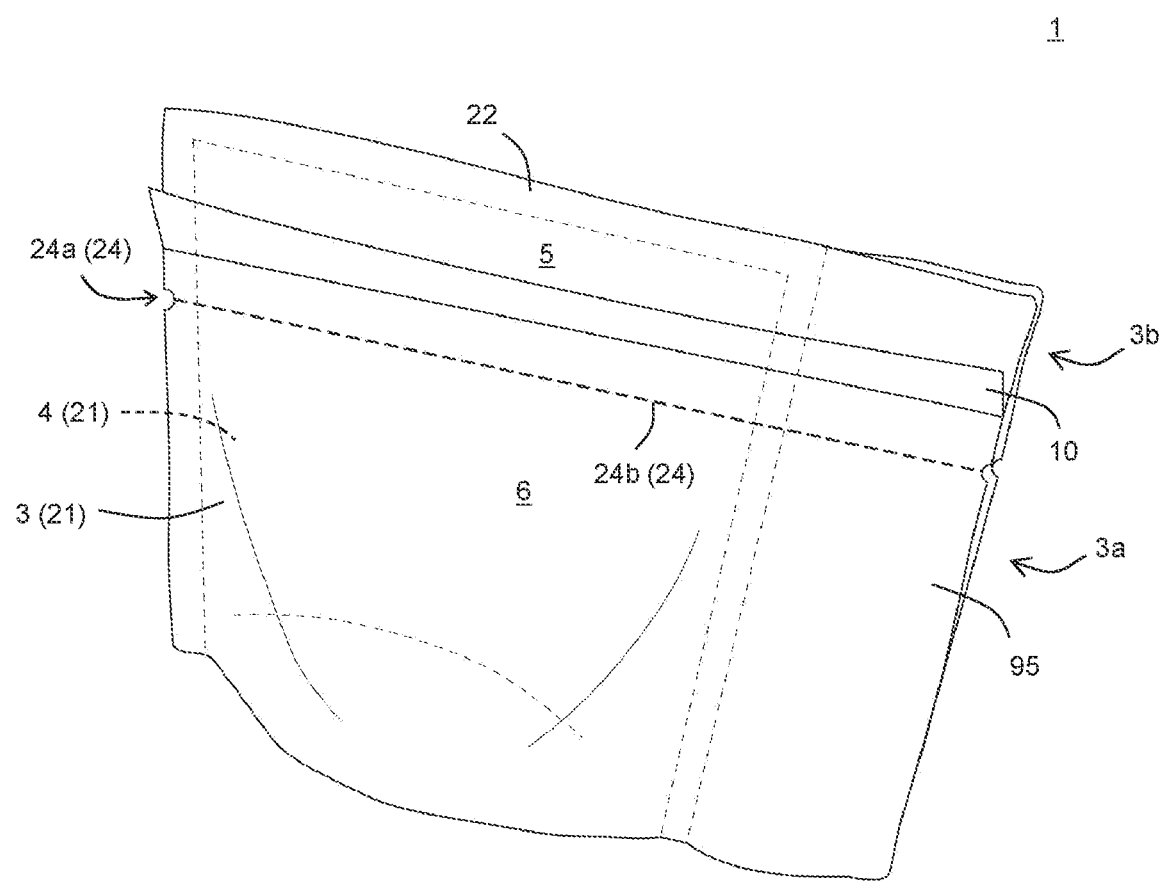

FIG. 32 is a diagrammatic view of the first embodiment of the packaging bag 1 in a state in which the contents are contained within the packaging bag 1.

Figure 33:
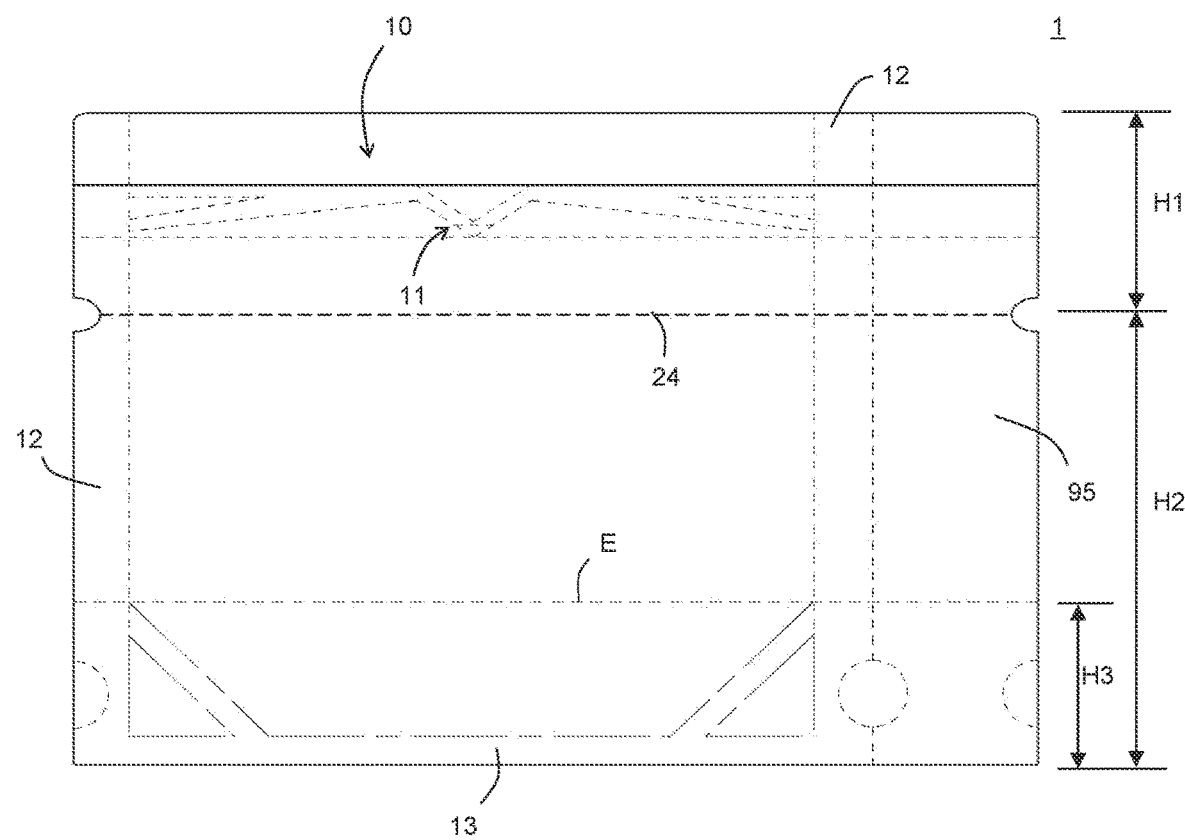

FIG. 33 shows the packaging bag 1 in plan view.

Figure 34A:
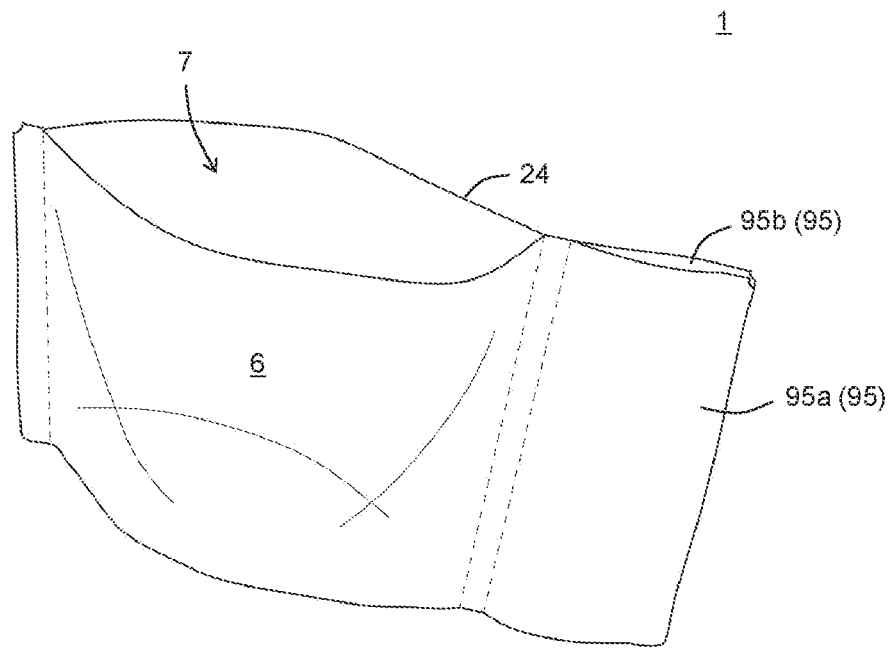
Figure 34B:
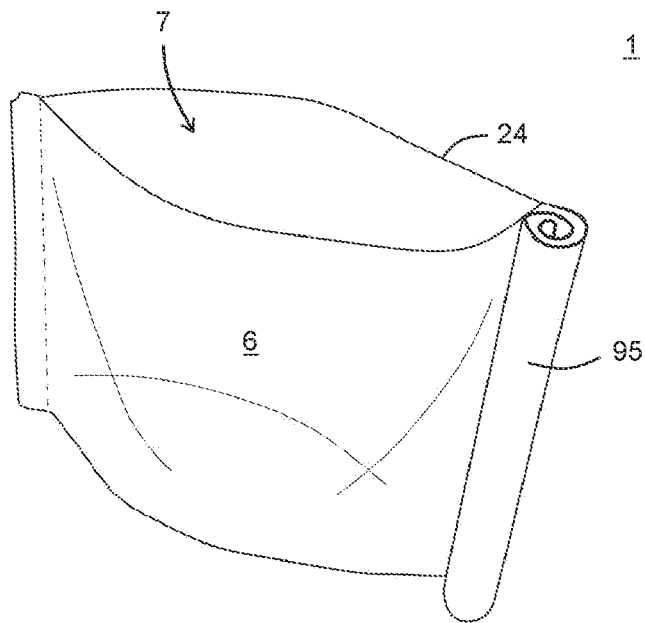

FIG. 34a is a diagonal view of the packaging bag 1 in an opened state. FIG. 34B shows the state in which the gripping portion 95 is rolled up for gripping.

Figure 35:
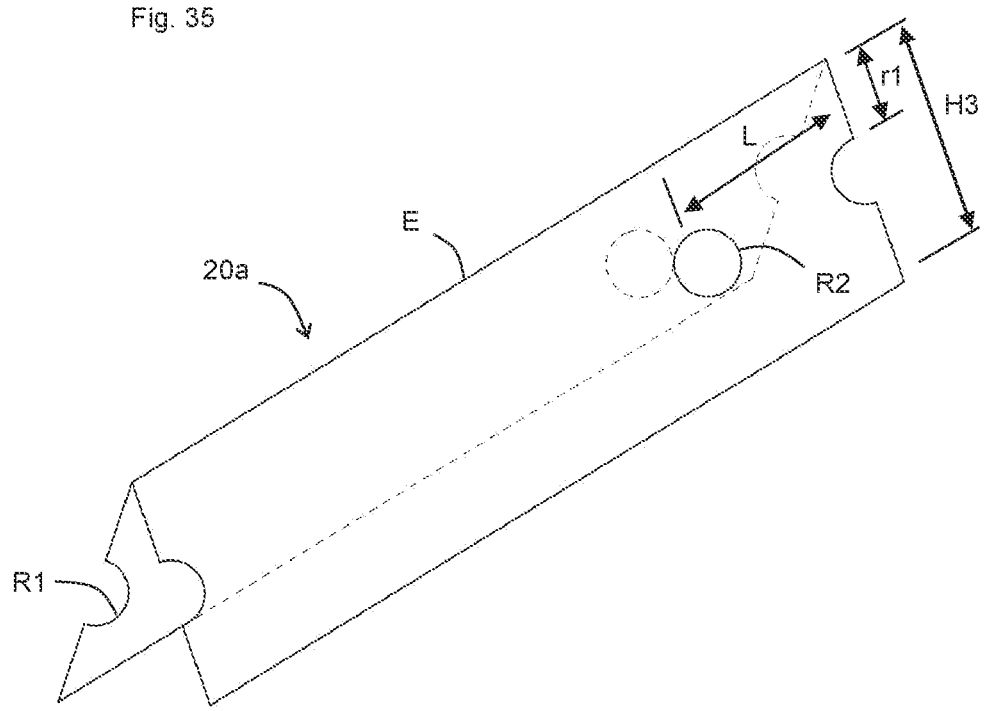

FIG. 35 is a diagonal view of the bottom film 20a, which constitutes the bottom portion 2.

Figure 36A:
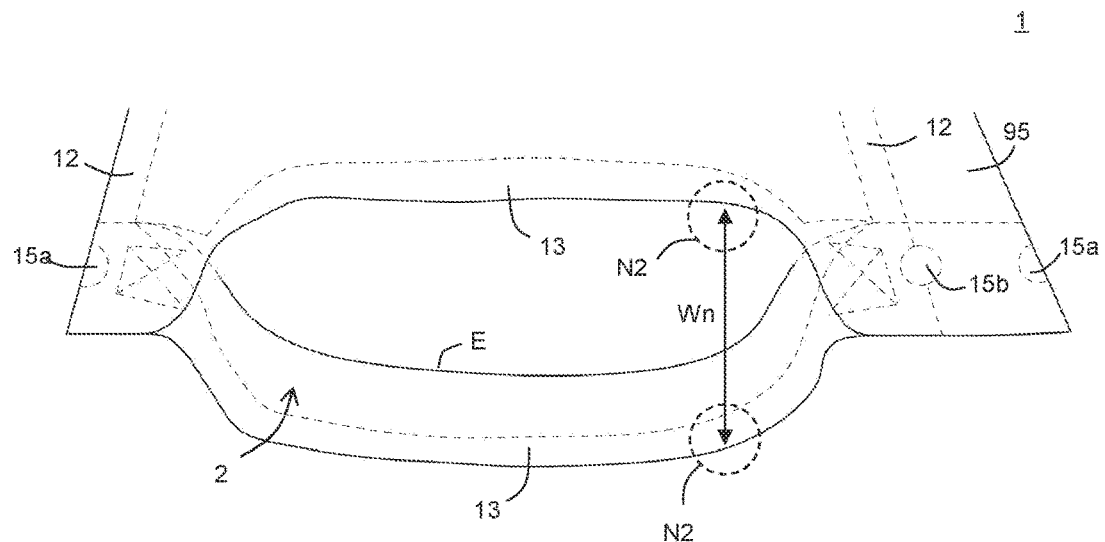
Figure 36B:
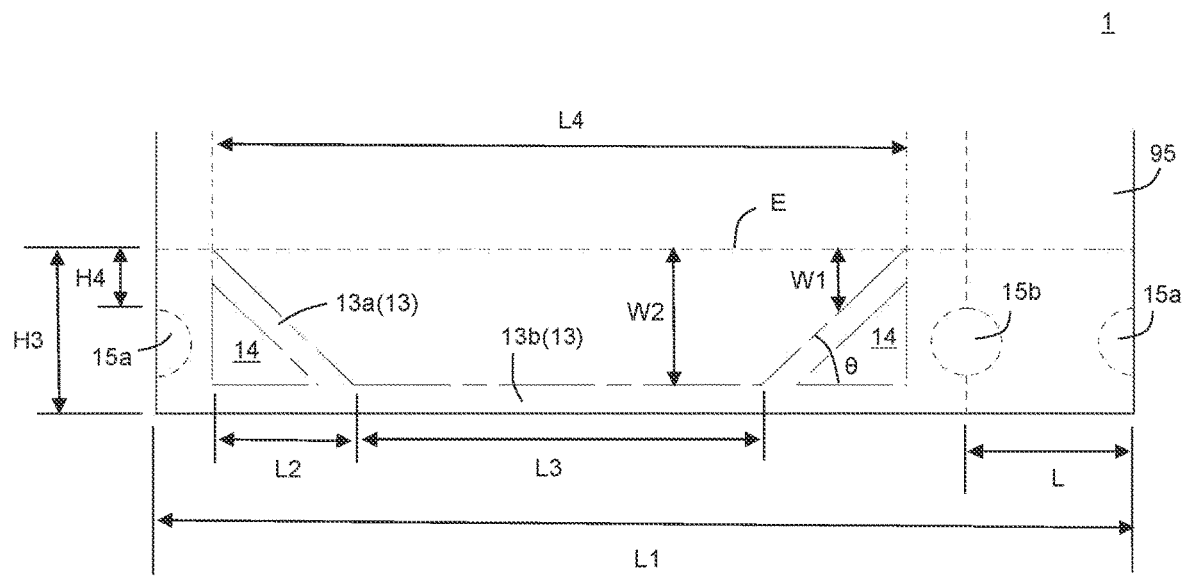

FIG. 36a is an enlarged view of the bottom portion 2 with the bottom end of the center of the packaging bag 1 opened wide in the front-back direction. FIG. 36b is a detailed view of the vicinity of the bottom end of the packaging bag 1 of FIG. 33.

Figure 37:
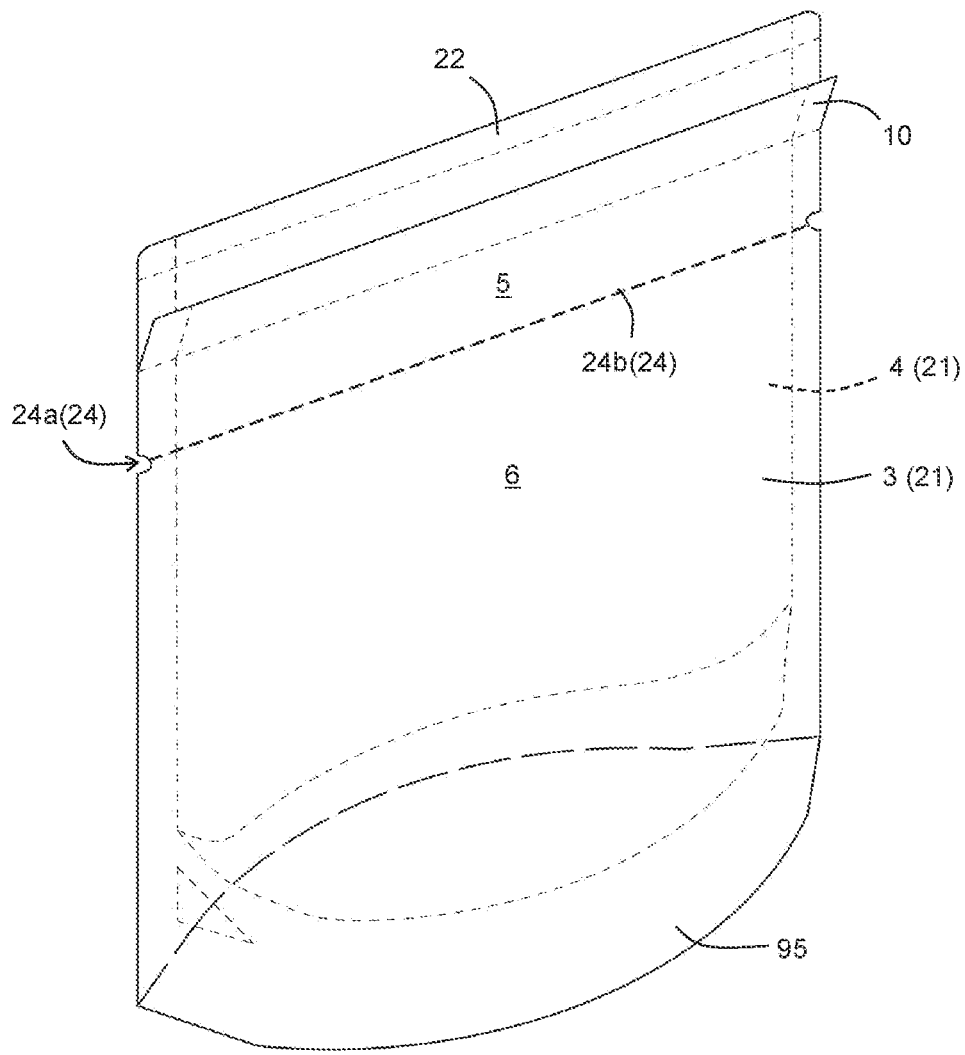

FIG. 37 is a diagram of the packaging bag 1 of the second embodiment.

Figure 38:
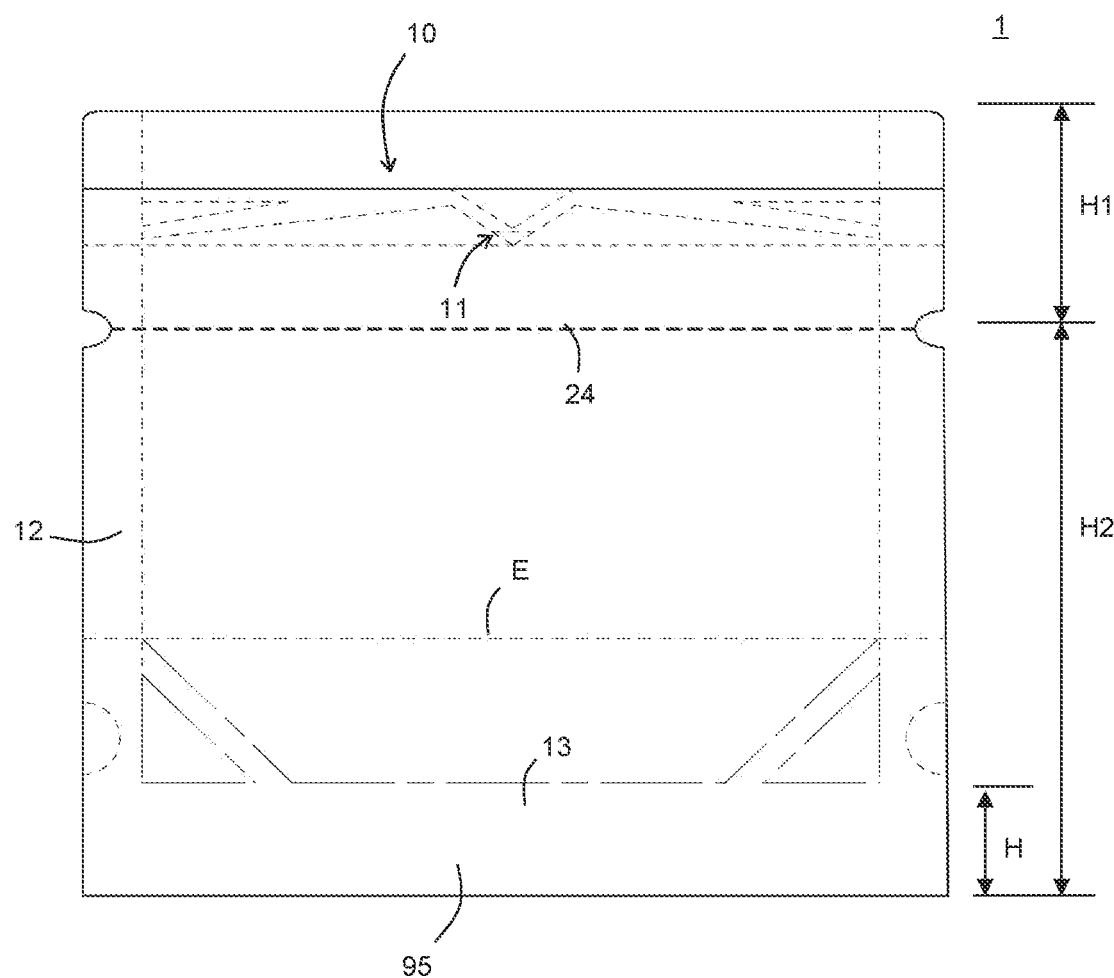

FIG. 38 is a plan view of the packaging bag 1 of the second embodiment.

Figure 39:
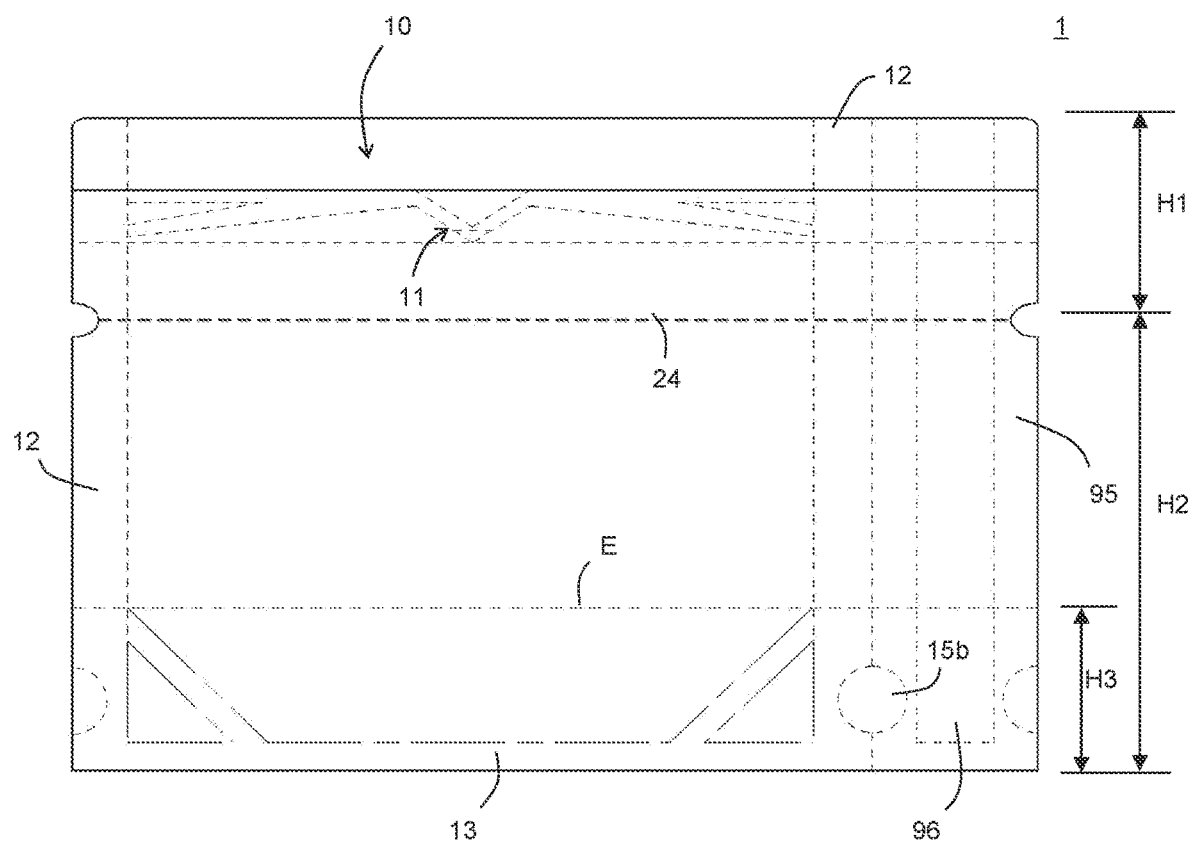

FIG. 39 shows the packaging bag 1 in another embodiment in plan view.

DESCRIPTION OF EMBODIMENTS

Hereinafter, embodiments of the present invention will be described. Various characteristics in the embodiments described below can be combined with each other. Further, the invention is independently established for each characteristic. Characteristics disclosed in each viewpoint can be combined with each other across viewpoints.

First Viewpoint

1. Packaging Bag 1

Figure 1A:
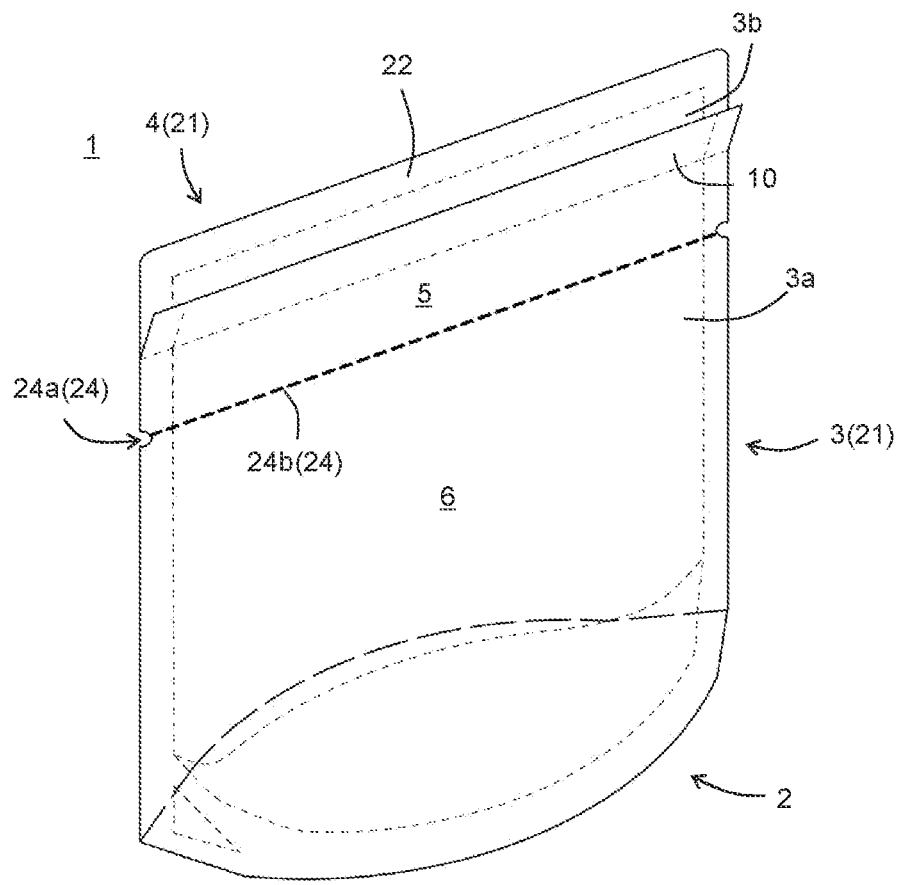
FIG. 1A is a perspective view of a state where contents are accommodated in a packaging bag 1 of one embodiment of the present invention.

First, a packaging bag 1 manufactured by a manufacturing system 30 of the packaging bag 1 of the present invention will be described. As shown in FIG. 1A to FIG. 3, the packaging bag 1 is a self-standing packaging bag that is made of a flexible film formed into a bag shape and is for use in a microwave oven. The packaging bag 1 includes a bottom surface portion 2 and a peripheral surface portion 21 provided so as to rise from the bottom surface portion 2. The peripheral surface portion 21 includes a front surface portion 3 and a back surface portion 4 facing each other. The front surface portion 3 and the back surface portion 4 are welded to each other at their edges in the left-right direction (hereinafter, referred to as side edges). The bottom surface portion 2 is welded (heat-sealed) to the front surface portion 3 and the back surface portion 4. In this way, the bottom surface portion 2, the front surface portion 3, and the back surface portion 4 are welded to each other to form the bag shape. In this regard, as shown in FIG. 1A, when contents are accommodated inside, an upper-edge welded portion 22 is provided at an upper edge of the packaging bag 1 to seal the packaging bag 1.

Figure 2:
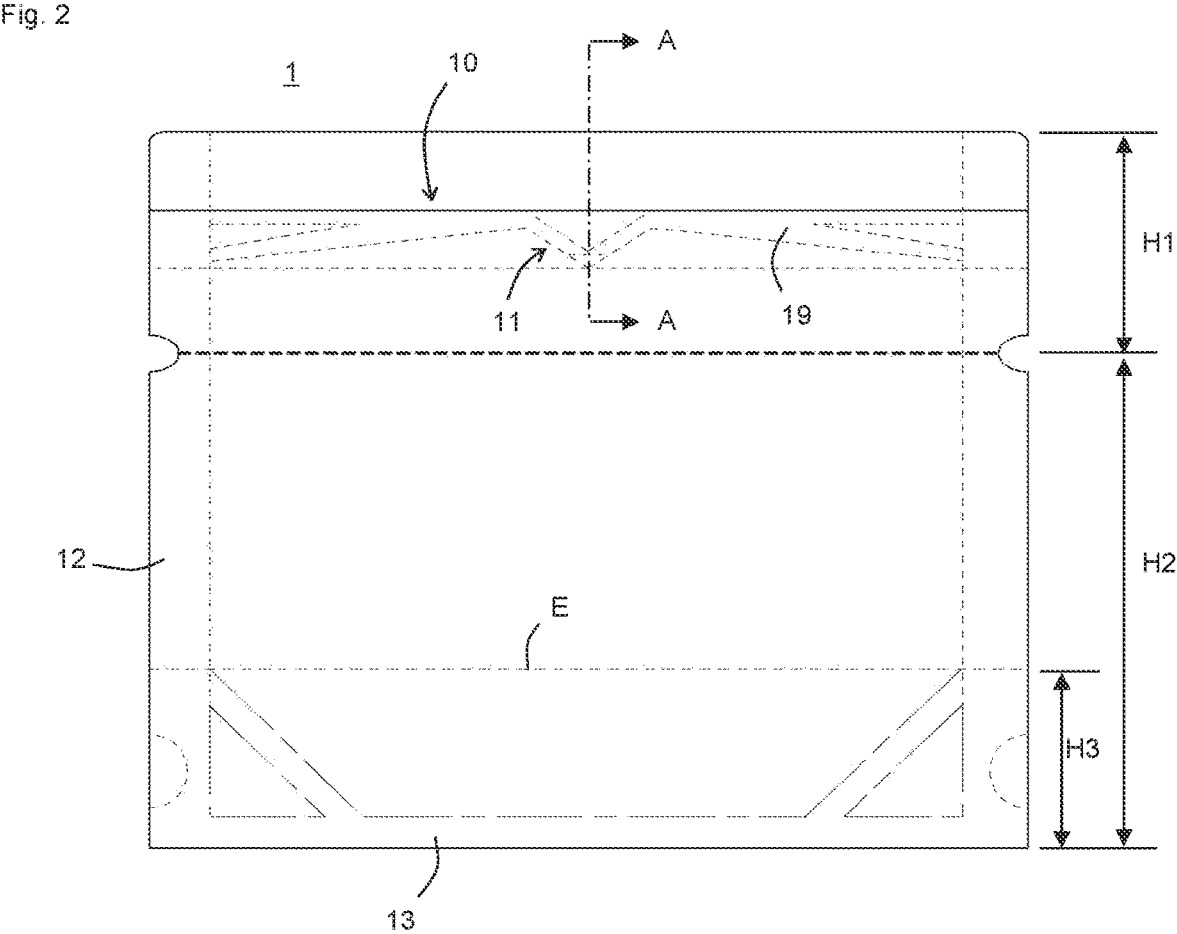
FIG. 2 shows the packaging bag 1 of FIG. 1A in a plan view.
Figure 3:
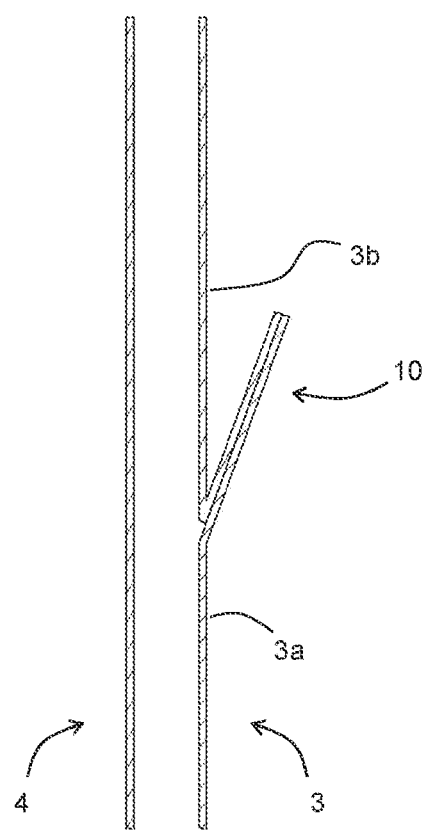
FIG. 3 is a cross-sectional view taken along a A-A line in FIG. 2.

In the present disclosure, the up, down, left, and right sides of FIG. 2 are described as the up, down, left, and right sides of the packaging bag 1. Specifically, a side of the bottom surface portion 2 is the down (lower) side, and a side of the front surface portion 3 (and the back surface portion 4) is the up (upper) side. Further, the left and right sides when the front surface portion 3 is placed in front are the left and right sides of the packaging bag 1. In addition, a side of the front surface portion 3 is the front side, and a side of the back surface portion 4 is the back side.

The front surface portion 3 includes a lower front surface portion 3a and an upper front surface portion 3b. The lower front surface portion 3a is welded to the bottom surface portion 2. As shown in FIG. 3A, the lower front surface portion 3a and the upper front surface portion 3b are welded to each other at a joint portion 10 formed by overlapping an inner surface of the lower front surface portion 3a and an inner surface of the upper front surface portion 3b in a state that the lower front surface portion 3a and the upper front surface portion 3b are both folded back.

As shown in FIG. 1A to FIG. 3, the peripheral surface portion 21 of the packaging bag 1 is provided with an opening portion 24. The opening portion 24 is a portion for opening the packaging bag 1. In the present embodiment, the opening portion 24 includes a tear start portion 24a configured to serve as a starting point for tearing the peripheral surface portion 21, and a tear-off line 24b where a line indicating a tear-off portion for opening is printed. The packaging bag 1 may be opened by tearing the peripheral surface portion 21 using the tear start portion 24a as a starting point or may be opened by cutting the peripheral surface portion 21 along the tear-off line 24b using a cutting tool, such as scissors. The tear start portion 24a is a portion that facilitates tearing of the peripheral surface portion 21 and includes, for example, a notch or a small cut part. One of the tear start portion 24a and the tear-off line 24b may be omitted. Further, the opening portion 24 may be configured differently to enable the packaging bag 1 to be opened. For example, instead of the tear-off line 24b, a half-cut line extending in the circumferential direction of the peripheral surface portion 21 may be provided, or a strip-shaped film extending in the circumferential direction of the peripheral surface portion 21 may be provided. The strip-shaped film is welded to the peripheral surface portion 21, and the peripheral surface portion 21 can be cut along the strip-shaped film by grasping and pulling the end of the strip-shaped film.

Figure 1B:
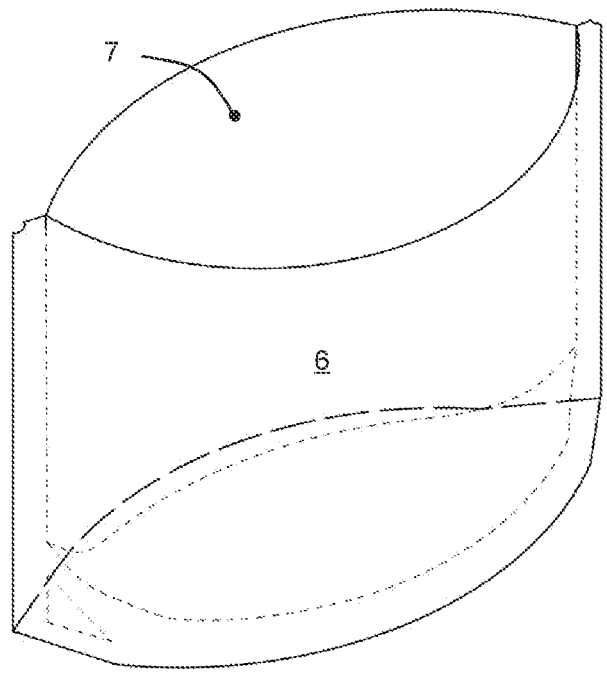
FIG. 1B is a perspective view of the packaging bag 1 in an opened state.

The packaging bag 1 includes a tear-off portion 5 arranged on an upper side and a main body portion 6 arranged on a lower side in the up-down direction with the opening portion 24 as a boundary. A container-shaped main body portion 6 is obtained by tearing the peripheral surface portion 21 in the circumferential direction at the opening portion 24 to remove the tear-off portion 5 above the opening portion 24. As shown in FIG. 1B, an opening 7 is formed in the main body portion 6. The main body portion 6 is used as a dish for eating the contents in the packaging bag 1.

The opening portion 24 is provided closer to the bottom surface portion 2 than the joint portion 10. In other words, the joint portion 10 is provided in the tear-off portion 5. Therefore, when the tear-off portion 5 is removed for opening, the joint portion 10 is also removed together. Thus, the joint portion 10 does not interfere with eating the contents.

FIG. 2 shows the packaging bag 1 in a plan view. The plan view is a view of the packaging bag 1 that is flattened with no contents contained inside and viewed in such a state from a direction perpendicular to the front surface portion 3 of the packaging bag 1. As shown in FIG. 2, the packaging bag 1 is formed to be line-symmetric with respect to the center line in the left-right direction.

A vapor release seal portion 11 is formed on the packaging bag 1. The vapor release seal portion 11 is provided in the joint portion 10. The vapor release seal portion 11 is a welded portion with lower welding strength than other welded portions. When the internal pressure in the packaging bag 1 increases due to vapor generated inside by heating the packaging bag 1, a vapor flow path is formed accordingly in the vapor release seal portion 11. The vapor inside the packaging bag 1 is discharged to the outside through the vapor release seal portion 11. The vapor release seal portion 11 is connected to a side-edge welded portion 12 via an end seal portion 19.

The length H1 of the tear-off portion 5 in the up-down direction is, for example, 6 to 10 cm. The length H2 of the main body portion 6 in the up-down direction is, for example, 6 to 14 cm, preferably equal to or less than 12 cm, and more preferably equal to or less than 10 cm. If the length is too large, it will be difficult to take out the contents. H1 is specifically, for example, 6, 6.5, 7, 7.5, 8, 8.5, 9, 9.5, or 10 cm, and may be in a range between any two of the numerical values exemplified herein. H2 is specifically, for example, 6, 7, 8, 9, 10, 11, 12, 13, or 14 cm, and may be in a range between any two of the numerical values exemplified herein.

Further, the length H2 is preferably longer than the length H3 from a center line E to a lower end of a bottom film 20a, and more preferably longer than H3 by 2 cm or more. The value of (H2−H3) is, for example, 2 to 8 cm, specifically, for example, 2, 3, 4, 5, 6, 7, or 8 cm, and may be in a range between any two of the numerical values exemplified herein. If the value of (H2−H3) is less than 2 cm, the height of the peripheral wall when the packaging bag 1 is opened becomes low, and thus the amount of contents may be limited.

The side edges of the packaging bag 1 are provided with a side-edge welded portion 12 for welding the front surface portion 3 and the back surface portion 4. Consequently, the front surface portion 3 and the back surface portion 4 are fixed in the front-back direction. Further, a lower edge of the packaging bag 1 is provided with a lower-edge welded portion 13 for welding the bottom surface portion 2 and the front surface portion 3, and the bottom surface portion 2 and the back surface portion 4.

The lower-edge welded portion 13 is a welded portion provided on a lower side below the center line E, and welds the bottom surface portion 2 to the front surface portion 3 and welds the bottom surface portion 2 to the back surface portion 4 at the side edges and lower edge of the packaging bag 1 (in FIG. 2, the region surrounded by the alternate long and short dash line).

Figure 4:
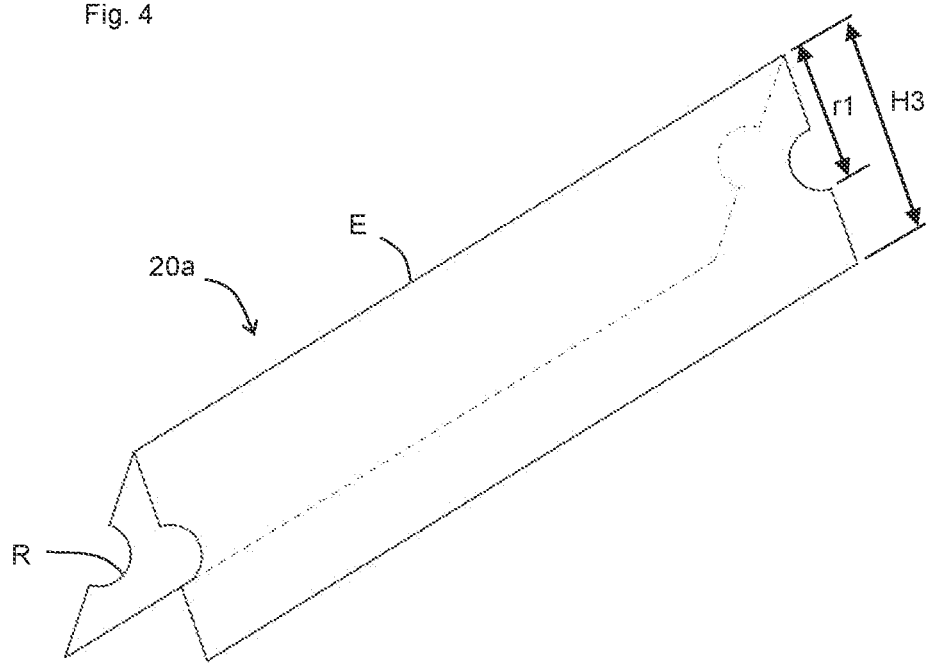
FIG. 4 is a perspective view of a bottom film 20a constituting a bottom surface portion 2.

As shown in FIG. 4, the packaging bag 1 is manufactured by inserting the bottom film 20a that is folded in a V shape at the center line E between the front surface portion 3 and the back surface portion 4. Here, the length H3 from the center line E to the lower end of the bottom film 20a is preferably 3 to 6 cm, more specifically, for example, 3, 3.5, 4, 4.5, 5, 5.5, or 6 (unit: cm), and may be in a range between any two of the numerical values exemplified herein, and may be, for example, 4.5 cm. As described above, the main body portion 6 is also used as a dish, and thus it is preferably that the body portion 6 has such a size. A notch R is formed at both ends of the bottom film 20a.

The length r1 from the center line E to the lower end of the notch R of the bottom film 20a is preferably 1 to 3 cm, more specifically, for example, 1, 1.5, 2, 2.5, or 3 (unit: cm), and may be in a range between any two of the numerical values exemplified herein, and may be, for example, 2.5 cm.

The diameter of the notch R is preferably 1 to 4 cm, more specifically, for example, 1, 1.5, 2, 2.5, 3, 3.5, or 4 (unit: cm), and may be in a range between any two of the numerical values exemplified herein, and may be, for example, 2 cm.

Figure 5A:
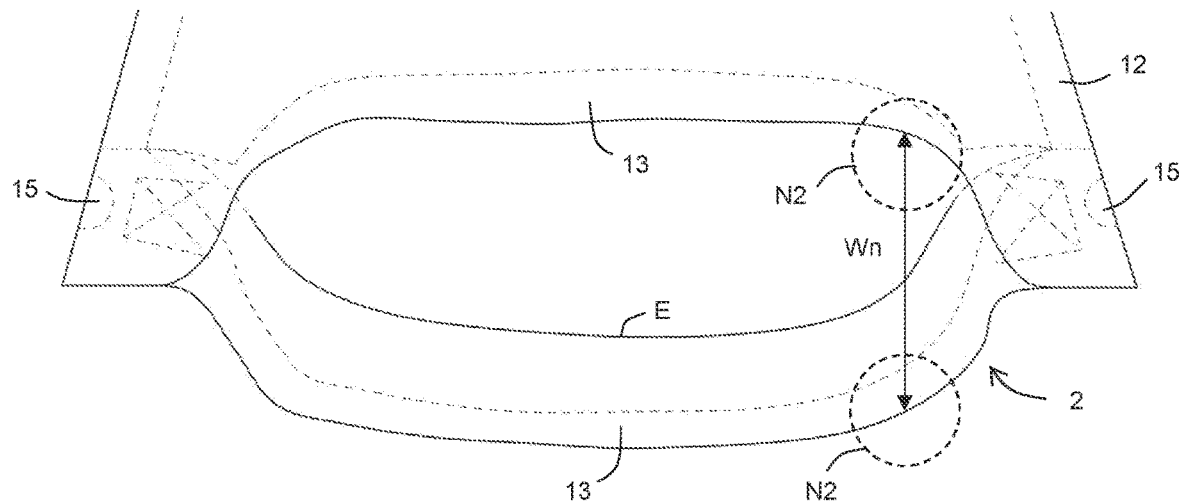
FIG. 5A is an enlarged view of the bottom surface portion 2 in a state where a center lower end of the packaging bag 1 is widely opened in a front-back direction.

As shown in FIG. 5A, the packaging bag 1 is configured to open wider in the front-back direction at a lower end of the center portion in the left-right direction (hereinafter, referred to as the center lower end) than at a lower end of the side portions in the left-right direction (hereinafter, referred to as the side lower ends). This is because the front surface portion 3 and the back surface portion 4 are directly welded to each other at the notch R formed on the bottom film 20a, and a fixed portion 15 is configured to fix the front surface portion 3 and the back surface portion 4 in the front-back direction. In this regard, by opening the center lower end in the front-back direction, the center line E of the bottom surface portion 2 is pulled to the back surface of the packaging bag 1.

Figure 5B:
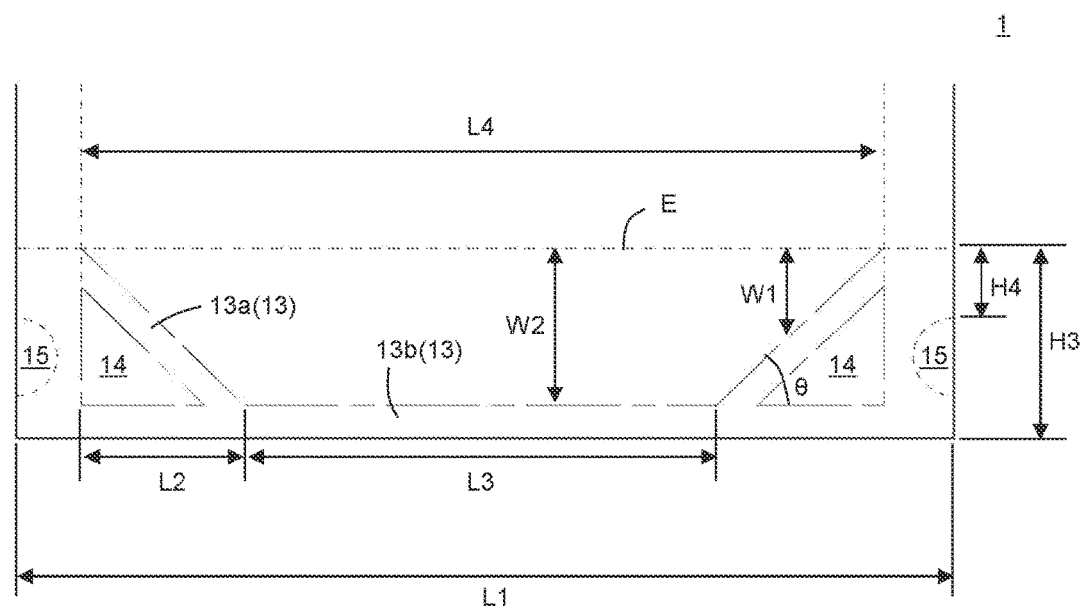
FIG. 5B is a detailed view of the vicinity of the lower end of the packaging bag 1 of FIG. 2.

As shown in FIG. 5B, the lower-edge welded portion 13 includes a pair of gradient portions 13a and a center portion 13b. The gradient portion 13a is a portion that is welded at a gradient (diagonally) from the side edge of the packaging bag 1 to the center lower end. By providing the gradient portion 13a in such a way, the distance from the center line E to the lower-edge welded portion 13 gradually increases (W1<W2) from the side edge to the center portion in the left-right direction. This configuration prevents pinhole from occurring at the side lower end.

The center portion 13b is provided between a pair of gradient portions 13a and is formed in a straight line. By providing the center portion 13b in a straight line, the main body portion 6 can be easily used as a dish.

An air pocket 14 is provided on the outer side of the gradient portion 13a. The air pocket 14 is formed in a triangular shape and is a space where air that has not been discharged to the outside during welding at the lower-edge welded portion 13 remains. By providing the air pocket 14, residual air in the lower-edge welded portion 13 is collected in the air pocket 14, thereby improving welding strength.

The length L1 in the left-right direction at the lower end of the packaging bag 1 is preferably 15 to 25 cm and more preferably equal to or more than 18 cm. The length L1 is more specifically, for example, 15, 16, 17, 18, 19, 20, 21, 22, 23, 24, or 25 (unit: cm) and may be in a range between any two of the numerical values exemplified herein, and may be, for example, 20 cm. If the length L1 is more than 25 cm, the packaging bag 1 may not fit in a turntable of a microwave oven. However, this does not apply to a packaging bag for use in a microwave oven with a flat table.

The length L2 of the gradient portion 13a in the left-right direction is preferably 3 to 6 cm, more specifically, for example, 3, 3.5, 4, 4.5, 5, 5.5, or 6 (unit: cm), and may be in a range between any two of the numerical values exemplified herein, and may be, for example, 4 cm. If the length L2 is too small, it will be difficult to fully open the center lower end in the front-back direction.

The length L3 of the center portion 13b in the left-right direction is preferably 5 to 15 cm and more preferably equal to or more than 8 cm. More specifically, the length L3 is, for example, 5, 6, 7, 8, 9, 10, 11, 12, 13, 14, or 15 (unit: cm) and may be in a range between any two of the numerical values exemplified herein, and may be, for example, 10 cm. By setting the value of L3 in this way, when the bottom surface portion 2 is extended in the front-back direction, the distance between the front surface portion 3 and the back surface portion 4 in the front-back direction can be increased, thereby increasing the size of the opening 7.

The length L4 inside the packaging bag 1 in the left-right direction is preferably 10 to 23 cm and more specifically, for example, 10, 11, 12, 13, 14, 15, 16, 17, 18, 19, 20, 21, 22, or 23 (unit: cm). Further, the length L4 may be in a range between any two of the numerical values exemplified herein and may be, for example, 18 cm.

The length W2 from the center line E to the upper end of the center portion 13b is preferably 3 to 6 cm and more specifically, for example, 3, 3.5, 4, 4.5, 5, 5.5, or 6 (unit: cm). Further, the length W2 may be in a range between any two of the numerical values exemplified herein and may be, for example, 4 cm. In this regard, the length W2 is more preferably the same length as the length L2 of the gradient portion 13a in the left-right direction.

In this regard, the ratio of the length L3 of the center portion 13b in the left-right direction to the length W2 from the center line E to the upper end of the center portion 13b preferably satisfies the condition of $2 \leq L3/W2 \leq 3$. Preferably, the value of L3/W2 is more specifically, for example, 2.0, 2.2, 2.4, 2.6, 2.8, or 3.0 and may be in a range between any two of the numerical values exemplified herein. In such a configuration, when the bottom surface portion 2 is extended in the front-back direction, a larger bottom surface in contact with the mounting surface can be provided.

Further, the ratio of the length W2 from the center line E to the upper end of the center portion 13b to the length L2 of the gradient portion 13a in the left-right direction preferably satisfies the condition of $0.5 \leq W2/L2 \leq 1.7$. Preferably, the value of W2/L2 is more specifically, for example, 0.5, 0.6, 0.7, 0.8, 0.9, 1.0, 1.1, 1.2, 1.3, 1.4, 1.5, 1.6, or 1.7 and may be in a range between any two of the numerical values exemplified herein. More preferably, the value of W2/L2 satisfies the condition of $0.8 \leq W2/L2 \leq 1.2$, even more preferably $0.9 \leq W2/L2 \leq 1.1$. When W2/L2 is too small, the front surface portion 3 and the back surface portion 4 tend to become closer to each other at the opening 7 when the packaging bag 1 is opened, which reduces convenience when using it as a dish. On the other hand, when W2/L2 is too large, a crease is generated on the inner side of the gradient portion 13a when the bottom surface portion 2 is extended in the front-back direction, which will interfere with removal of the contents.

The ratio of the height H4 from the center line E to the upper end of the fixed portion 15 to the length H3 from the center line E to the lower end preferably satisfies the condition of $H4/H3 \geq 0.2$. Preferably, the value of H4/H3 satisfies the condition of $0.5 > H4/H3 \geq 0.2$, and is more specifically, for example, 0.20, 0.25, 0.30, 0.35, 0.40, 0.45, or 0.50 and may be in a range between any two of the numerical values exemplified herein. By setting the height H4 from the center line E to the fixed portion 15 in this way, the opening 7 can be reliably kept open in the front-back direction.

The value of the angle $\theta$ of the gradient portion 13a relative to the upper end of the center portion 13b is preferably 30 to 60 degrees, and more specifically, for example, 30, 35, 40, 45, 50, 55, or 60 (unit: degrees). The angle $\theta$ may be in a range between any two of the numerical values exemplified herein, and more preferably 45 degrees. By setting the angle $\theta$ of the gradient portion 13a larger than 30 degrees, the width Wn in the front-back direction between vicinity regions N2 in the vicinity of the side edges of the packaging bag 1 can be secured, and the bottom surface of the packaging bag 1 can be larger, thereby improving the self-standing stability of the packaging bag 1 (see FIG. 5A). In addition, the opening 7 can be opened wide in the front-back direction, and thus the convenience of using the packaging bag as a dish is improved.

Here, a film constituting the peripheral surface portion 21 and a film constituting the bottom surface portion 2 are preferably laminated films including a base material layer and a sealant layer, and more preferably, the laminated films includes an adhesive layer and a printing layer between the base material layer and the sealant layer.

The base material layer is arranged so as to be exposed on the outer surface of the packaging bag 1, and the sealant layer is arranged so as to be exposed on the inner surface of the packaging bag 1. The welded portion is formed by welding (heat-sealing) the sealant layers to each other.

The base material layer is formed of a material having excellent strength and high impact resistance. As the base material layer, for example, polyamide, polyolefin, polyethylene, polyester, and the like are used. More specifically, oriented polyethylene terephthalate film, silica-deposited oriented polyethylene terephthalate film, alumina-deposited oriented polyethylene terephthalate film, oriented nylon film, oriented polypropylene film, polypropylene/ethylene-vinyl alcohol copolymer co-extruded co-oriented film, or the like can be used. As a film forming the base material layer, a film having straight line cuttability in the MD direction (the direction in which the film flows during manufacturing) is preferably used. The base material layer, which is the outermost layer, may contain antibacterial or antiviral agent, such as silver ions. In particular, by kneading a bleed-out antibacterial or antiviral agent into the base material layer, the antibacterial or antiviral treatment progresses on the surface of the base material layer when it is heated to a high temperature in a microwave oven, which is hygienic and preferable when removing from the microwave oven.

The adhesive layer is a layer for allowing the base material layer and the sealant layer to adhere to each other so as to be laminated. The adhesion method may be extrusion lamination using, for example, polyethylene as the adhesive layer, or may be dry lamination using polyvinyl acetate adhesive, polyacrylate adhesive, cyanoacrylate adhesive, ethylene copolymer adhesive, cellulose adhesive, polyester adhesive, polyamide adhesive, amino resin adhesive, epoxy adhesive, polyurethane adhesive, and the like as adhesive material.

The sealant layer can be formed of resin with excellent weldability. The sealant layer can be formed with polyolefin-based resins, such as polyethylene, polypropylene, ethylene-vinyl acetate copolymer, and ethylene-propylene block copolymer. More specifically, non-oriented polypropylene and linear low-density polyethylene can be used. As a film forming the sealant layer, a film having straight line cuttability in the MD direction is preferably used.

The sealant layer, which is the innermost surface of the packaging bag 1, may be subjected to an easy-slipping treatment. The easy-slipping treatment is a treatment for enhancing slipping property, and can be performed by mixing or applying a lubricant to the sealant layer or by applying a water repellent or oil repellent treatment to the innermost surface of the packaging bag 1. Consequently, the slipping property of the contents adhering to the inner surface of the packaging bag 1 is improved. The easy-slipping treatment is preferably performed in the vicinity of the opening portion 24 and in the tear-off portion 5. When the packaging bag 1 is heated with the packaging bag 1 laid down, the contents may move to the opening portion 24 and the tear-off portion 5, and hands or scissors may get dirty in such a case when the packaging bag 1 is opened. In the packaging bag 1 subjected to the easy-slipping treatment, the contents fall to the bottom when the packaging bag 1 is set upright, so that hands and scissors are prevented from getting dirty when the packaging bag 1 is opened.

The easy-slipping treatment may be performed during film production or during bag manufacturing.

As an example, in the present embodiment, the film has a structure including the base material layer: oriented nylon (25 μm)/printing layer/adhesive layer (dry laminate)/sealant layer: LLDPE (60 μm). In this regard, an intermediate layer may be provided between the base material layer and the sealant layer. As the intermediate layer, a film made of polyethylene terephthalate, polyamide, polyolefin, such as polyethylene and polypropylene, polyvinyl chloride, polycarbonate, polyvinyl alcohol, ethylene-propylene copolymer, ethylene-vinyl acetate copolymer saponified products, a film obtained by coating the film made of these materials with polyvinylidene chloride, a film obtained by vapor deposition of inorganic substance, such as silicon oxide and aluminum oxide, or a film made of polyvinylidene chloride or the like can be used.

In this regard, a film constituting the bottom surface portion 2 is preferably a film whose tensile modulus decreases with increasing temperature. In this case, when the packaging bag 1 is heated, the film softens, and the center lower end of the packaging bag 1 can be easily opened in the front-back direction. Here, M1 and M2 represent tensile modulus of the film forming the bottom surface portion 2 in the TD direction (corresponding to the front-back direction of the packaging bag 1) at 23.5° C. and 100° C., respectively. The tensile modulus can be obtained by conducting a tensile test in accordance with JIS K 7127. The test speed in the tensile test is set at 50 mm/min, and the dumbbell shape for the test is No. 5.

M1 is preferably 600 to 1400 MPa and more preferably 800 to 1200 MPa. M1 is specifically, for example, 600, 700, 800, 900, 1000, 1100, 1200, 1300, or 1400 MPa, and may be in a range between any two of the numerical values exemplified herein.

M2 is preferably 200 to 600 MPa and more preferably 300 to 500 MPa. M2 is specifically, for example, 200, 250, 300, 350, 400, 450, 500, 550, or 600 MPa, and may be in a range between any two of the numerical values exemplified herein.

The value of M1/M2 is, for example, 1.2 to 4 and preferably 1.5 to 3. This value is specifically, for example, 1.2, 1.5, 2, 2.5, 3, 3.5, or 4, and may be in a range between any two of the numerical values exemplified herein.

As a film constituting the peripheral surface portion 21, a film with the same physical properties as a film constituting the bottom surface portion 2 may be used, or a film with different physical properties from a film constituting the bottom surface portion 2 may be used.

2. Overview of Manufacturing Method of Packaging Bag 1

Hereinafter, the overview of manufacturing steps of the packaging bag 1 will be described with reference to FIG. 6A to FIG. 7B. The steps described below are performed while various films are conveyed along a manufacturing line.

Figure 6A:
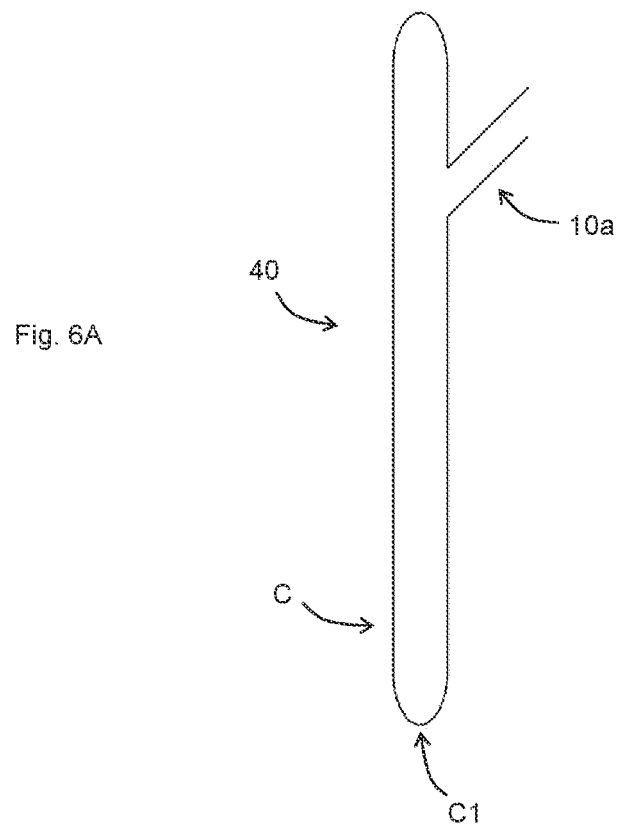
FIG. 6A is a side view of a peripheral long film 40.
Figure 6B:
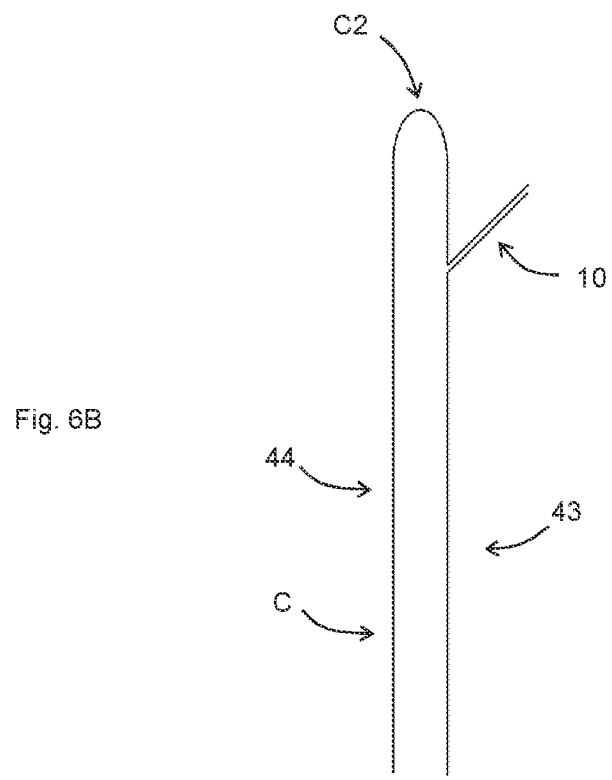
FIG. 6B shows a state after a part of the peripheral long film 40 is cut.

First, as shown in FIG. 6A, inner surfaces of edges of one sheet of peripheral long film 40 are overlapped with each other to form an overlapping portion 10a. Then, as shown in FIG. 6B, the joint portion 10 is formed by welding the overlapping portion 10a, and the remaining portion forms an elliptical ring C. In the joint portion 10, the vapor release seal portion 11 and the end seal portion 19 of the same shape as in FIG. 2 are formed. Consequently, a front surface long film 43 and a back surface long film 44 facing each other are obtained. The peripheral long film 40 is a long film that extends continuously in the direction perpendicular to the plane of paper (conveyance direction) of FIG. 6A and is supplied by unwinding a film roll. The front surface long film 43 and the back surface long film 44 are long films that extends continuously in the direction perpendicular to the plane of paper (conveyance direction) of FIG. 6A. Instead of processing the peripheral long film 40 to obtain the front surface long film 43 and the back surface long film 44, the front surface long film 43 and the back surface long film 44 may be supplied from separate film rolls.

Then, as shown in FIG. 6B, one end (lower end) C1 of the ring C is cut. The front surface long film 43 and the back surface long film 44 are connected to each other at the other end (upper end) C2 in the present embodiment, but the front surface long film 43 and the back surface long film 44 may be separated at the other end C2 at this point of time.

Figure 7A:
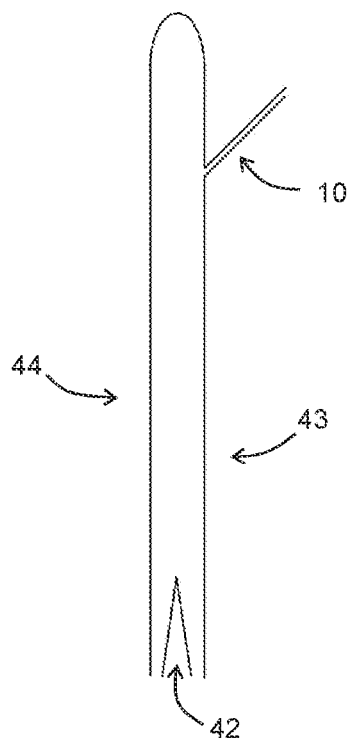
FIG. 7A shows a state after inserting a bottom long film 42 in a V shape between a front surface long film 43 and a back surface long film 44.

Next, as shown in FIG. 7A, a bottom long film 42 is inserted between the front surface long film 43 and the back surface long film 44 from a side of the one end C1. The bottom long film 42 is a film that extends continuously in the direction perpendicular to the plane of paper (conveyance direction) of FIG. 7A. Circular openings 46 (shown in FIG. 8) that serve as the notch R of the bottom film 20a are formed on the bottom long film 42 before insertion.

Figure 7B:
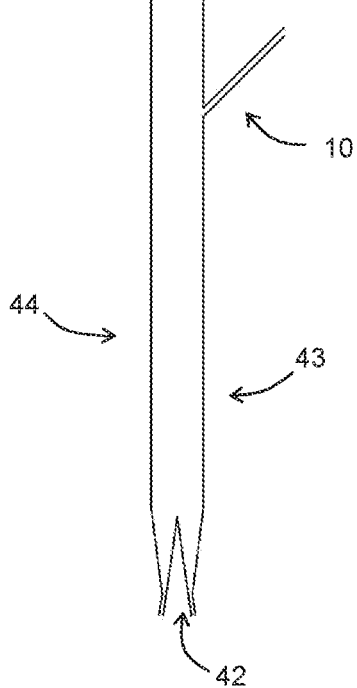
FIG. 7B shows a state after welding the bottom long film 42 to the front surface long film 43 and to the back surface long film 44.

Next, as shown in FIG. 7B, the bottom long film 42 is welded to the front surface long film 43 and to the back surface long film 44. Consequently, the lower-edge welded portion 13 having the same shape as in FIG. 2 is formed.

Figure 8:
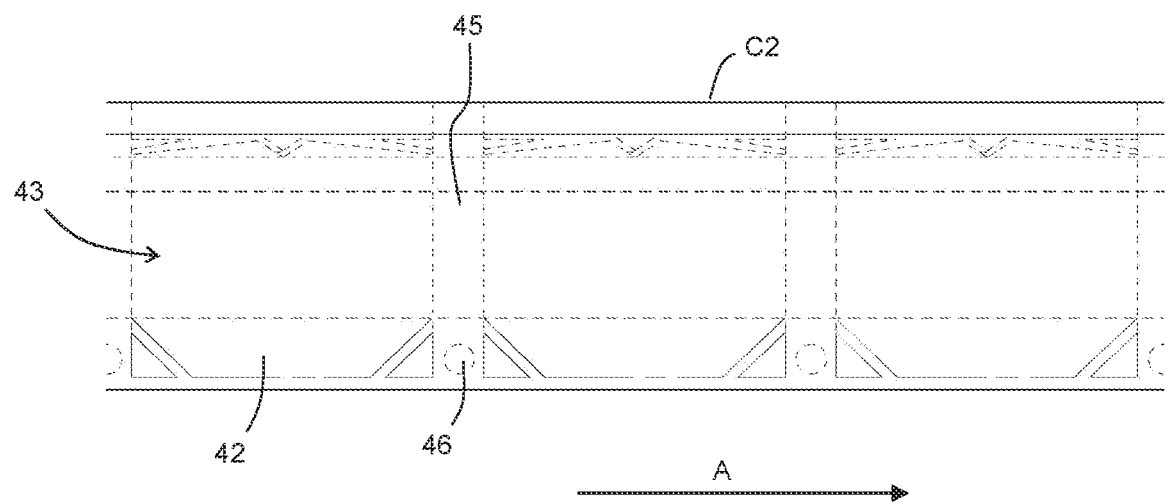
FIG. 8 shows a state after forming a transverse seal portion 45 from the state of FIG. 7B

Next, as shown in FIG. 8, a transverse seal portion 45 extending in the direction perpendicular to the conveyance direction A of the front surface long film 43 and the back surface long film 44 is formed at the same pitch as the length L1 in FIG. 5B so as to weld the front surface long film 43 and the back surface long film 44 to each other. The width of the transverse seal portion 45 is twice the width of the side-edge welded portion 12.

Next, the front surface long film 43 and the back surface long film 44 are separated at the other end C2 to open the upper edge.

Next, the front surface long film 43, the back surface long film 44, and the bottom long film 42 are cut off along the transverse seal portion 45. This cutoff is preferably performed in the center of the transverse seal portion 45 in the width direction. Consequently, the packaging bag 1 shown in FIG. 2 is obtained.

3. Manufacturing System 30 of Packaging Bag 1

Next, the manufacturing system 30 of the packaging bag 1 according to one embodiment of the present invention will be described with reference to FIG. 9A to FIG. 12B. The manufacturing method described above is preferably performed using the manufacturing system 30.

The manufacturing system 30 includes a film supply device 31, a conveying device 32, a bottom insertion device 33, a bottom sealing device 34, a transverse sealing device 35, an upper portion cutter 36, and a cutoff device 37.

3-1. Film Supply Device 31

As shown in FIG. 9A, the film supply device 31 supplies the front surface long film 43 and the back surface long film 44 facing each other. In the present embodiment, the film supply device 31 includes a peripheral long film roll 40a, turning rollers 40b, a former 40c, a joint portion sealing device 40d, a joint portion cooling device 40e, and a cutter 40f.

The peripheral long film 40 unwound from the peripheral long film roll 40a passes through the turning rollers 40b to remove curl and is then formed in the former 40c into the shape with the overlapping portion 10a where the inner surfaces of the edges of the peripheral long film 40 are overlapped, as shown in FIG. 6A. Next, the joint portion 10 is formed by welding the overlapping portion 10a in the joint portion sealing device 40d, and the remaining portion forms the elliptical ring C. The joint portion 10 is cooled by the joint portion cooling device 40e. The joint portion sealing device 40d includes a pair of seal bars 40d1, and the vapor release seal portion 11 and the end seal portion 19 are formed by sandwiching and pressing the overlapping portion 10a while heating it with a pair of seal bars 40d1. Further, the joint portion cooling device 40e includes a pair of cooling bars 40e1, and the joint portion 10 is cooled by sandwiching and pressing the joint portion 10 with a pair of cooling bars. The cutter 40f cuts the one end C1 of the ring C. Consequently, the front surface long film 43 and the back surface long film 44 separated from each other at the one end C1 are obtained. The cutter 40f has a blade on an edge 40f1 on the upstream side in the conveyance direction, and the angle between this edge 40f1 and the conveyance direction (in other words, the angle between the edge 40f1 and the one end C1) is greater than 90 degrees. Consequently, the one end C1 of the ring C is more easily cut than when the one end C1 comes into contact with the edge 40f1 in the perpendicular direction. This angle is, for example, 100 to 170 degrees, and preferably 120 to 150 degrees. This angle is, specifically, for example, 100, 110, 120, 130, 140, 150, 160, or 170 degrees, and may be in a range between any two of the numerical values exemplified herein.

In this regard, the film supply device 31 may be configured to unwind and supply the front surface long film 43 and the back surface long film 44 from separate film rolls.

3-2. Conveying Device 32

The front surface long film 43 and the back surface long film 44 are conveyed along the manufacturing line by the conveying device 32. The bottom insertion device 33, the bottom sealing device 34, the transverse sealing device 35, and the cutoff device 37 are arranged in this order along the conveyance direction. The upper portion cutter 36 can be arranged at any position.

The conveyance direction is usually along the longitudinal direction of the front surface long film 43 and the back surface long film 44. The conveying device 32 includes a plurality of roller pairs 51 to 54. Each of the roller pairs includes a pair of rollers 50. Each of the roller pairs 51 to 54 pinches the front surface long film 43 and the back surface long film 44, and a pair of rollers 50 rotate in opposite directions to each other in that state, so that the front surface long film 43 and the back surface long film 44 are fed downstream.

The conveying device 32 preferably repeats one pitch of conveyance and stop for a predetermined period of time. During the stop for a predetermined period of time, processes, such as sealing, cooling, and cutoff are performed. Processing accuracy is enhanced by performing these processes during the stop. The distance of one pitch of conveyance is, for example, the length of one packaging bag 1 in the left-right direction (i.e., the length L1). In other words, after the conveyance for the distance of the length of one packaging bag 1, the conveyance is stopped for a predetermined period of time during which various devices perform processes, such as sealing, cooling and cutoff. By repeating such steps, a large number of packaging bags 1 can be efficiently manufactured. One pitch of conveyance can be achieved by rotating a plurality of roller pairs 51 to 54 synchronously.

The number and arrangement of roller pairs are not particularly limited, as long as the film can be properly conveyed. The arrangement in the present embodiment is as follows. The roller pair 51 is arranged between the joint portion cooling device 40e and the cutter 40f, as shown in FIG. 9A. The roller pair 52 is arranged between an insertion start position IS of the bottom insertion device 33 and the bottom sealing device 34, as shown in FIG. 10A to FIG. 11B. The roller pair 53 is arranged between the bottom sealing device 34 and the transverse sealing device 35, as shown in FIG. 11A and FIG. 11B. The roller pair 54 is arranged between the transverse sealing device 35 and the cutoff device 37, as shown in FIG. 11A to FIG. 12B.

3-3. Bottom Insertion Device 33

Figure 10A:
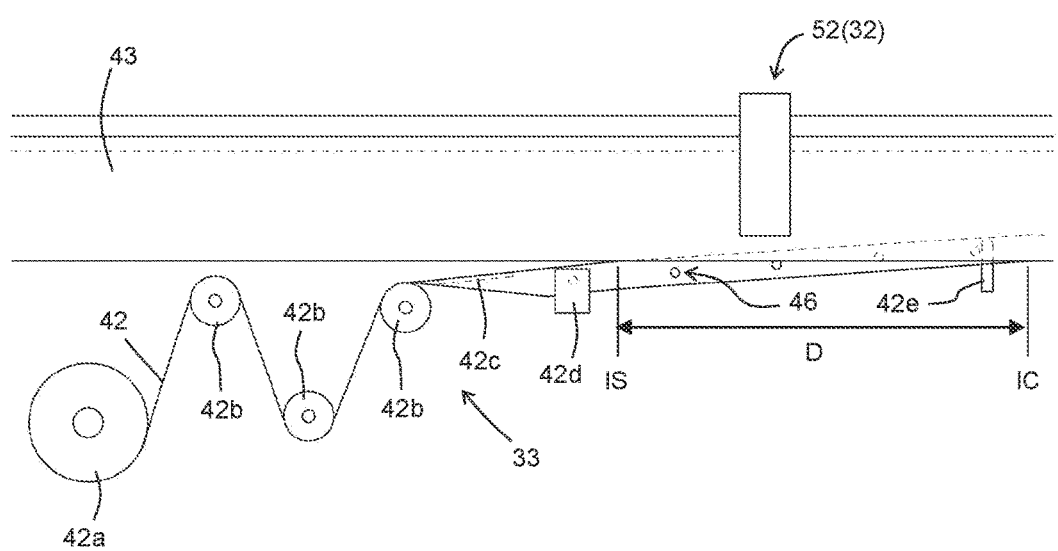
FIG. 10A shows a part of the manufacturing system 30 downstream from FIG. 9A and FIG. 9B in a plan view.
Figure 10B:
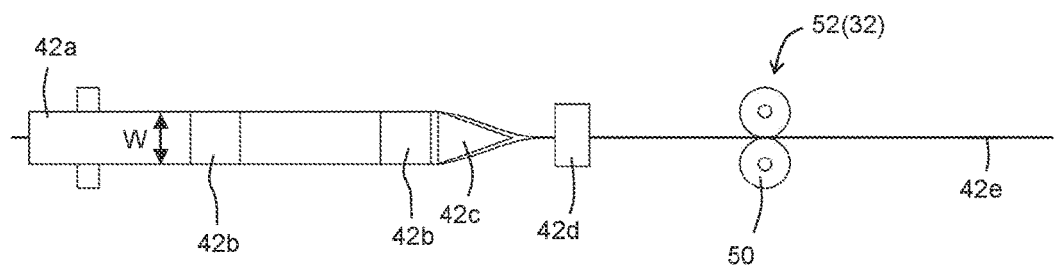
FIG. 10B shows a part of the manufacturing system 30 downstream from FIG. 9A and FIG. 9B in a front view.
Figure 11A:
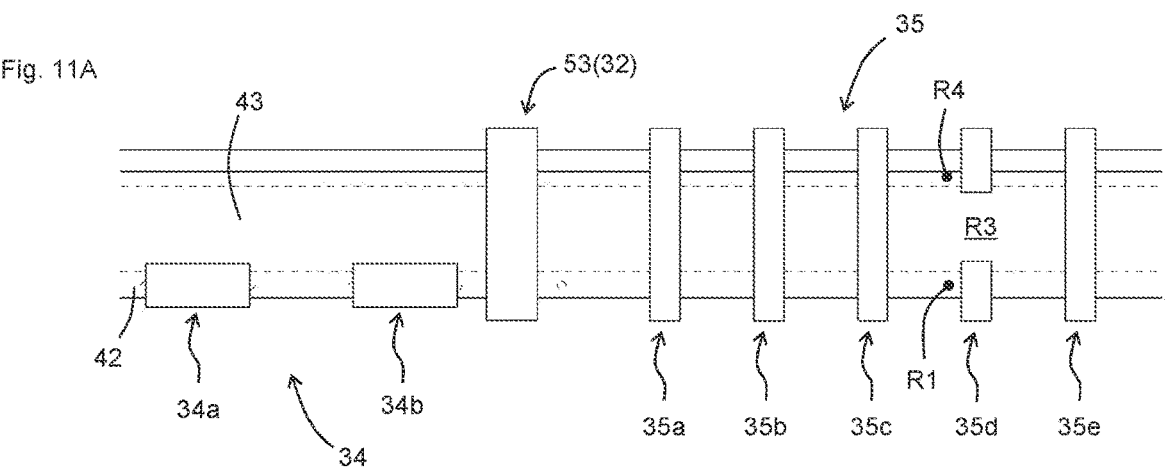
FIG. 11A shows a part of the manufacturing system 30 downstream from FIG. 10A and FIG. 10B in a plan view.
Figure 11B:
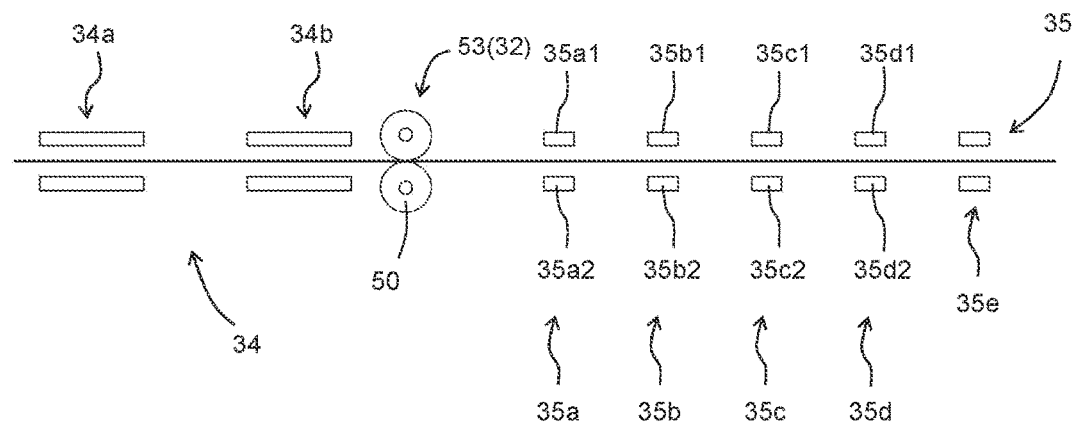
FIG. 11B shows a part of the manufacturing system 30 downstream from FIG. 10A and FIG. 10B in a front view.
Figure 12A:
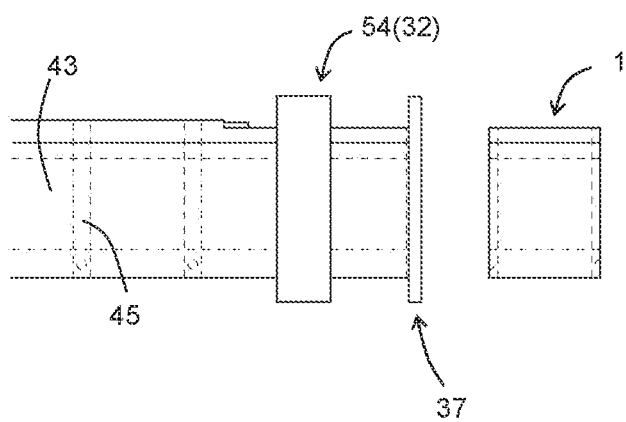
FIG. 12A shows a part of the manufacturing system 30 downstream from FIG. 11A and FIG. 11B in a plan view.
Figure 12B:
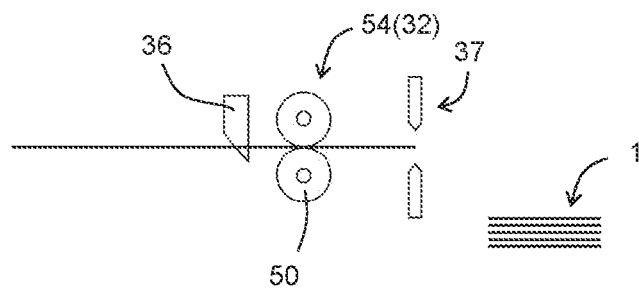
FIG. 12B shows a part of the manufacturing system 30 downstream from FIG. 11A and FIG. 11B in a front view.

As shown in FIG. 10A and FIG. 10B, the bottom insertion device 33 is configured to start inserting the bottom long film 42 between the front surface long film 43 and the back surface long film 44 at the insertion start position IS and to complete the insertion of the bottom long film 42 at an insertion completion position IC downstream from the insertion start position IS.

In the present embodiment, the bottom insertion device 33 includes a bottom long film roll 42a, turning rollers 42b, a former 42c, a punching device 42d, and a guide member 42e.

The bottom long film 42 unwound from the bottom long film roll 42a passes through the turning rollers 42b to remove curl and is then folded into a V-shape, as shown in FIG. 7A, at the former 42c. Next, the punching device 42d forms the circular openings 46 on the bottom long film 42 folded into the V-shape. Then, the bottom long film 42 folded into the V-shape is inserted between the front surface long film 43 and the back surface long film 44, as shown in FIG. 7A, by being guided by the guide member 42e.

If the distance between the insertion start position IS and the insertion completion position IC is short, creases are likely to occur on the bottom long film 42. Therefore, in the present embodiment, the distance D between the insertion start position IS and the insertion completion position IC is 10 or more times longer than W, where W represents the width of the bottom long film 42 in an unfolded state. This suppresses the occurrence of the creases on the bottom long film 42. D/W is, for example, 10 to 50, specifically, for example, 10, 11, 12, 13, 14, 15, 16, 17, 18, 19, 20, 30, 40, or 50, and may be in a range between any two of the numerical values exemplified herein. In one example, D is, for example, 1 m or more, and preferably 1 to 5 m. This length is, specifically, for example, 1, 1.1, 1.2, 1.3, 1.4, 1.5, 1.6, 1.7, 1.8, 1.9, 2, 3, 4, or 5 m, and may be in a range between any two of the numerical values exemplified herein.

From the viewpoint of stable conveyance of the long films 42, 43, 44, it is preferable to provide the roller pair 52 between the insertion start position IS and the bottom sealing device 34 (for example, between the insertion start position IS and the insertion completion position IC). However, if the roller pair 52 pinches the bottom long film 42 in a state where the bottom long film 42 is not welded to the front surface long film 43 and the back surface long film 44, creases or misalignment may occur on the bottom long film 42. Therefore, the roller pair 52 is preferably arranged so as not to pinch the bottom long film 42. In other words, the roller pair 52 pinches the front surface long film 43 and the back surface long film 44 only in the region where the bottom long film 42 is not sandwiched between the front surface long film 43 and the back surface long film 44. This suppresses the occurrence of creases or misalignment on the bottom long film 42.

The pinching pressure of the roller pair 52 is preferably less than the pinching pressure of other roller pairs (the roller pair 51 or the roller pair 53). This is because creases and misalignment are likely to occur on the bottom long film 42 if the pinching pressure is too high. The value of (pinching pressure of the roller pair 52/pinching pressure of other roller pairs) is, for example, 0.01 to 0.9, and preferably 0.05 to 0.5. This value is specifically, for example, 0.01, 0.05, 0.1, 0.2, 0.3, 0.4, 0.5, 0.6, 0.7, 0.8, or 0.9, and may be in a range between any two of the numerical values exemplified herein.

3-4. Bottom Sealing Device 34

As shown in FIG. 7B, FIG. 11A, and FIG. 11B, the bottom sealing device 34 is configured to weld the bottom long film 42 to the front surface long film 43 and to the back surface long film 44.

In the present embodiment, the bottom sealing device 34 includes a pair of seal bars 34a and a pair of cooling bars 34b. The pair of seal bars 34a sandwiches and presses the region where the bottom long film 42 is sandwiched between the front surface long film 43 and the back surface long film 44, while heating the region, so that the bottom long film 42 can be welded to the front surface long film 43 and to the back surface long film 44. Further, the pair of cooling bars 34b cool a portion heated by the pair of seal bars 34a, so that the softened sealant layer can be solidified. At the portion where the opening 46 is formed, the front surface long film 43 and the back surface long film 44 are welded through the opening 46. The cooling bars 34b can be omitted if not needed.

3-5. Transverse Sealing Device 35

As shown in FIG. 7B, FIG. 8, FIG. 11A and FIG. 11B, the transverse sealing device 35 forms the transverse seal portion 45 extending in the direction perpendicular to the conveyance direction so as to weld the front surface long film 43 and the back surface long film 44 to each other.

Preferably, the transverse sealing device 35 includes first to fourth seal bar pairs 35a to 35d and a pair of cooling bars 35e. Each of the seal bar pairs includes a front surface seal bar 35a1 to 35d1 and a back surface seal bar 35a2 to 35d2. The first to fourth seal bar pairs 35a to 35d are spaced apart in the conveyance direction. The fourth seal bar pair 35d is arranged most downstream. The distance between adjacent seal bar pairs is preferably the same as the length of one pitch of conveyance.

Each of the first to fourth seal bar pairs 35a to 35d sandwiches and presses the front surface long film 43 and the back surface long film 44 while heating them. Consequently, the transverse seal portion 45 is formed. The pair of cooling bars 35e cool a portion heated by the seal bars, so that the softened sealant layer can be solidified.

Preferably, at least one of the plurality of seal bar pairs (preferably the one arranged most downstream. In the present embodiment, the fourth seal bar pair 35d) is configured to heat and pinch a bottom region R1 where the bottom long film 42 is sandwiched between the front surface long film 43 and the back surface long film 44 and a joint region R4 where the joint portion 10 is formed and is configured not to pinch an intermediate region R3 between the bottom region R1 and the joint region R4. Since four layers of film are overlapped in the bottom region R1 and the joint region R4, welding tends to be insufficient in these regions. Therefore, by locally heating and pinching the bottom region R1 and the joint region R4, welding defects in these regions can be suppressed.

Preferably, the temperature of the back surface seal bar 35a2 is higher than the temperature of the front surface seal bar 35a1 in the first seal bar pair 35a, the temperature of the front surface seal bar 35b1 is higher than the temperature of the back surface seal bar 35b2 in the second seal bar pair 35b, and the temperature of the back surface seal bar 35c2 is higher than the temperature of the front surface seal bar 35c1 in the third seal bar pair 35c. When the front surface long film 43 and the back surface long film 44 are sandwiched and pressed while being heated by the seal bars at such temperature, the films are conveyed in a state where the temperature on the front surface side is not too high, to the position of the fourth seal bar pair 35d. Further, by locally heating and pinching the bottom region R1 and the joint region R4 at the fourth seal bar pair 35d, welding defects can be especially suppressed.

3-6. Upper Portion Cutter 36

The upper portion cutter 36 cuts the upper portion of the front surface long film 43 and the back surface long film 44 and forms an opening at the upper edge of the front surface long film 43 and the back surface long film 44. The upper portion cutter 36 may form the opening by cutting off the upper portion of the front surface long film 43 and the back surface long film 44 at a predetermined width or may form the opening by slitting the other end C2. The upper portion cutter 36 may be arranged at another position on the manufacturing line or may be omitted. If omitted, it is preferable to perform the process of forming the opening at the upper edge of the divided packaging bag 1.

3-7. Cutoff Device 37

The cutoff device 37 is configured to cut off the front surface long film 43, the back surface long film 44, and the bottom long film 42 along the transverse seal portion 45. Consequently, the packaging bag 1 cut and separated from the long films 43, 44, 42 is obtained. Since this cutoff is performed for each pitch of conveyance, one packaging bag 1 can be manufactured for each pitch of conveyance. In this regard, the tear start portion 24a may be formed at the time of this cutoff.

4. Other Embodiments

While the embodiments have been described above, the technical ideas in the present disclosure can be also adopted in the following aspects.

Although the fixed portion 15 is configured by the semicircular notch R formed on the bottom surface portion 2 in the above-described embodiments, the configuration is not limited to this example. For example, the facing surfaces of the bottom film may be adhered to each other using an adhesive agent, or the front surface portion 3 and the back surface portion 4 may be fixed in the front-back direction by a locking means, such as a stapler.

Although the bottom surface portion 2 is formed of a film folded in a V shape in the above-described embodiments, the configuration is not limited to this example. For example, it may be formed of a film folded in a W shape.

The packaging bag 1 may not include the vapor release seal portion 11. In such a case, the vapor generated during heating can be discharged, for example, by slightly opening the bag.

The packaging bag 1 may not include the joint portion 10.

The vapor release seal portion 11 may be provided in a portion other than the joint portion 10.

Second Viewpoint

As shown in FIGS. 13 to 18, the packaging bag 1 of this viewpoint is similar to the packaging bag 1 of the first viewpoint, and the explanation in the first viewpoint applies to the packaging bag 1 of this viewpoint as long as it does not contradict its purpose. Although the basic configuration of the packaging bag 1 of this viewpoint is common to the packaging bag 1 of the first viewpoint, the packaging bag 1 of this viewpoint may be manufactured using a manufacturing system other than the manufacturing system of the first viewpoint. The following explanation focuses on the differences.

1. Configuration of Packaging Bag 1

FIGS. 13 to 14 show the configuration of the packaging bag 1 of this viewpoint.

As shown in FIG. 15a, the packaging bag 1 is manufactured with the bottom film 20a bent in a V-shape at the center line E and inserted between the front part 3 and the back part 4. Semicircular notches R are formed at both ends of the bottom film 20a. The shape of the notch R is not limited to a semicircle, but may be a triangular notch, for example. The notch R should fit within the side end welding portion 12 so as not to restrict the front-to-back spread in the bottom portion 2 of the packaging bag 1.

The length r1 from the center line of the bottom film 20a to the bottom edge of the notch R should be 1.0 cm to 5.0 cm, more specifically, 1.0, 1.5, 2.0, 2.5, 3.0, 3.5, 4.0, 4.5, 5.0 (unit: cm), or any two of the values illustrated here. The value can be in the range between 3.5 cm and 3.0 cm, and can also be 3.5 cm, for example.

The diameter of the notch R is preferably between 0.5 cm and 4.0 cm, more specifically, 0.5, 1.0, 1.5, 2.0, 2.5, 3.0, 3.5, and 4.0 (unit: cm), and may be in the range between any two of the values illustrated here, for example, 1.5 cm. The value can also be between any two of the values illustrated here, for example, 1.5 cm.

Referring to FIGS. 15B to 16B, the manufacturing procedure of the packaging bag 1 will be briefly described below. First, as shown in FIG. 15B, the edges of one piece of peripheral film 20B are overlapped and welded together to form a joint 10, and the remaining portion forms a ring C.

Then, as shown in FIG. 16a, one end of the ring C is cut and the bottom film 20a, bent into a V-shape, is inserted. Then, as shown in FIG. 16B, the other end of the ring C is cut off and the bottom film 20a and peripheral film 20b are welded together to produce the packaging bag 1.

A pair of receding portions 16 is provided at the lower end of the side portion of the packaging bag 1. The receding portions are portions which, in plan view, are receding to the upper side with respect to the reference line S along the edge 17 at the lower end of the center portion of the packaging bag 1.

In this embodiment, the receding portion 16 is formed in a straight line connecting the edge 17 of the lower center portion of the packaging bag 1 and the edge 18 of the side edge, but it is not limited to this form. For example, the receding portion 16 may be formed in the form of an arc, or a step may be formed by cutting off a corner of the lower edge of the side portion of the packaging bag 1.

The length W2 from the center line E to the top of the central portion 13b is preferably between 2 cm and 5 cm, more specifically, 2.0, 2.5, 3.0, 3.5, 4.0, 4.5, 5.0 (unit: cm), or it may be in the range between any two of the values illustrated here, such as 4.0 The length W2 can be 4.0 cm. It is more preferable that the length W2 be the same length as the length L2 of the slope section 13a in the left-right direction.

The length L in the left-right direction of the retracted portion 16 should be L/L1≥0.05 relative to the length L1 in the left-right direction at the bottom end of the packaging bag 1. Preferably, it should be 0.4≥L/L1≥0.05. More specifically, the value of L/L1 can be 0.05, 0.10, 0.15, 0.20, 0.25, 0.30, 0.35, 0.40, or between any two of the values illustrated here.

The length L should be L/L5≥0.5 relative to the length L5 from the boundary 13c of the sloping portion 13a and the central portion 13b to the edge of the packaging bag 1. Preferably, it should be 1.0≥L/L5≥0.5, and more specifically, the value of L/L5 should be 0.50, 0.55, 0.60, 0.65, 0.70, 0.75, 0.80, 0.85, 0.90, 0.95, or 1.0, or between any two of the values illustrated here. It may be within the range. By securing the length of the retracted portion 16 in the left-right direction, it is possible to deter the packaging bag 1 from becoming unstable when the contents are reduced when the packaging bag 1 is used as a tableware, as the retracted portion 16 floats upward to make the packaging bag 1 stand on its own.

The length H in the vertical direction of the receding portion 16 should be from 0.5 cm to 2 cm or less, more specifically, 0.5, 1.0, 1.5, or 2.0 (unit: cm), and may be in the range between any two of the values illustrated here, for example 1 cm. Here, the recessed portion 16 is preferably formed below the fixed portion 15. By forming the receding portion 16 without interfering with the fixing portion 15 in this manner, it is possible to securely fix the front portion 3 and the back portion 4 in the front-back direction.

The value of the angle θ1 of the sloping portion 13a with respect to the upper edge of the central portion 13b should be between 30 and 60 degrees, and between 40 and 50 degrees is even more preferred. More specifically, the value can be 30, 35, 40, 45, 50, 55, or 60 (in degrees), or it can be in the range between any two of the values illustrated here, more preferably 45 degrees. By making the angle θ1 of the sloping portion 13a larger than 30 degrees, the width Wn in the front-back direction between the regions N2 near the recessed portion 16 can be secured, and the bottom of the packaging bag 1 can be secured to be larger, thus improving the self-standing stability of the packaging bag 1 (see FIG. 17a). At the same time, the convenience of using the bag as a tableware is improved because the aperture 7 can be opened wider in the front-back direction.

The value of the angle θ2 of the receding portion 16 relative to the reference line S is preferably between 5 and 30 degrees, more specifically, 5, 10, 15, 20, 25, or 30 (in degrees), and can also be in the range between any two of the values illustrated here, and more preferably, 20 degrees. It can also be between any two of the values illustrated here, more preferably 20 degrees. Here, by making the angle θ2 smaller than the angle θ1, the area of the air pocket 14 can be secured in the lower end welding section 13, and welding in the lower end welding section 13 is assured.

2. Usage of Packaging Bag 1

Referring to FIGS. 18a and 18b, the usage of the packaging bag 1 will be explained. FIG. 18A shows, as a comparative example, a packaging bag V without the recessed portions 16 at the lower ends of the side portions G1 and G2. As shown in FIG. 18A, in the case of the packaging bag V without the retraction portion 16, when the bag is placed on the placing surface B with the bag opened, a non-contact area M, which is not in contact with the placing surface B, occurs at the lower end of the central portion.

In other words, when the packaging bag V is opened and the lower end of the central portion is opened in the front-back direction, the film of the body portion (its height is indicated by Hp in FIG. 18A) will be inclined in the central portion in the left-right direction. Therefore, it will be pulled diagonally upward at the center F of the opening, and the lower end of the central portion will be lifted upward. However, since the side bottom edge G1 of the packaging bag V remains in contact with the placing surface B, a non-contact area M is generated at the center bottom edge.

Here, at the side lower ends G1 and G2, which are in contact with the placing surface B, the front and back portions are fixed in the front-back direction. Therefore, the packaging bag V is supported at two points at the side bottom edges G1 and G2 against the placing surface B in the front-back direction, which causes front-back rattling. The rattling is particularly noticeable when the contents are reduced as the meal progresses.

In contrast, as shown in FIG. 18B, the packaging bag 1 in this embodiment has a retracted portion 16 at the lower end of the side portion, so that when the bag is placed on the placing surface B with the lower end of the center portion open in the front-back direction, the regions N1 and N2 near the retracted portion 16 contact the placing surface B.

Here, in the neighboring regions N1 and N2, the front portion 3 and the back portion 4 are open in the front-back direction. Therefore, the packaging bag V is supported at four points in the front-back direction at the neighboring areas N1 and N2 against the placing surface B, and the self-supporting stability of the packaging bag 1 is improved.

Third Viewpoint

As shown in FIGS. 19 through 26, the packaging bag 1 of this viewpoint is similar to the packaging bag 1 of the first and second viewpoints, and the explanations in the first and second viewpoints also apply to the packaging bag 1 of this viewpoint, unless contrary to the intent. Although the basic configuration of the packaging bag 1 of this viewpoint is common to the packaging bag 1 of the first and second viewpoints, the packaging bag 1 of this viewpoint may be manufactured using a manufacturing system other than the manufacturing system of the first viewpoint, and it is not essential to have a retracting portion 16 as in the second viewpoint. The following explanation focuses on the differences.

1. First Embodiment 1-1. Configuration of Packaging Bag 1

As shown in FIGS. 19 to 20, the front portion 3 and the back portion 4 in the main body 6 have a reinforcing portion 75 that extends diagonally in the vertical direction. The reinforcement portion 75 is configured as a thermal history mark formed by applying a thermal history to the front portion 3 and the back portion 4. Details of the reinforcement portion 75 are described below.

Referring to FIGS. 21 to 22, the manufacturing procedure of the packaging bag 1 will be briefly described below.

First, as shown in FIG. 21A, the inner surfaces of the edges of one piece of peripheral film 20B are superimposed on each other to form an overlapping portion 10A. As shown in FIG. 21B, the overlapping portion 10A is welded to form a joining portion 10, and the remaining portion forms an oval-shaped ring C.

Then, as shown in FIG. 21A-FIG. 21B, one end C1 of the ring C is cut and a V-shaped folded bottom film 20a is inserted. Then, as shown in FIG. 21B to FIG. 22A, the bottom film 20a and the peripheral film 20b are welded together and the other end C2 of the ring C is cut to form the bottom portion 2, front portion 3, and back portion 4.

Then, as shown in FIG. 22b, a cushioning material 26 is inserted between the front and back portions 3 and 4 from near the other end C2 of the ring C (near the top of the front and back portions 3 and 4), and a thermal history is applied to the front and back portions 3 and 4 with a seal bar 27. As a result, a reinforcing portion 75 is formed in the front portion 3 and back portion 4, and the packaging bag 1 is produced.

The heat history constituting the reinforcing portion 75 is preferably applied with a sealing bar from the outside of the peripheral wall film 20B. In this way, the reinforcement portion 75 can be easily processed without affecting the inner sanitary surface that contains the contents.

Referring to FIGS. 23a and 23b, the reinforcement portion 75 is described in detail. As described above, the reinforcement portion 75 is configured as a thermal history mark formed by applying thermal history to the front portion 3 and the back portion 4. As shown in FIGS. 23a and 23b, the surface of the reinforcing portion 75 has the pattern of the surface of the seal bar 27 to which the heat history is applied transferred. Thereby, the reinforcement 75 attempts to maintain the flat shape of the reinforcement 75 when the front portion 3 and the back portion 4 are curved.

When the packaging bag 1 is opened, as shown in FIG. 23A, the reinforcing portion 75 with the thermal history marks formed tries to maintain a flat shape, so that edges P and Q are formed at both ends of the reinforcing portion 75 in the right and left directions. These edges P and Q function as ribs (creases for reinforcement) to maintain the opening of the aperture 7.

As shown in FIG. 23b, the reinforcing portion 75 should be symmetrical with respect to the left-right center line H of the packaging bag 1. At the periphery 7a of the opening 7, the length L5 of the reinforcing portion 75 in the left-right direction should be 0.3 to 2.0 cm, more specifically, 0.3, 0.5, 0.7, 0.9, 1.1, 1.3, 1.5, 1.7, 2.0 (unit: cm), or between any two of the values illustrated here. It can also be within the range, for example, 1.0 cm.

In the peripheral edge 7a of the opening 7, the length L6 from the center line H to the end point Q1 on the center side in the left-right direction of the reinforcing portion 75 should be $0.5 \leq L6/L7 \leq 2.0$ relative to the length L7 from the end point P1 on the outside in the left-right direction of the reinforcing portion 75 to the outer edge of the packaging bag 1. More specifically, the value of L6/L7 may be 0.5, 0.7, 0.9, 1.1, 1.3, 1.5, 1.7, or 2.0, or may be in the range between any two of the values illustrated here. By arranging the reinforcement 75 in this manner, it is easier to maintain the opening of the aperture 7.

The length H6 in the vertical direction of the reinforcing portion 75 should be $0.3 \leq H6/H5 < 1.0$ relative to the length H5 (corresponding to H2–H3 in FIG. 20) from the peripheral edge 7a of the opening 7 to the center line E. More specifically, the value of H6/H5 may be 0.3, 0.4, 0.5, 0.6, 0.7, 0.8, 0.9, or 1.0, or may be in the range between any two of the values illustrated here. By providing the vertical length of the reinforcement 75 in this manner, it is possible to ensure that it functions as a rib.

The inclination Φ of the reinforcing portion 75 with respect to the perpendicular line T in the vertical direction should be -45 to 45 degrees, with counterclockwise as the positive direction, and more specifically, -45, -35, -25 -15, -5, 0, 5, 15, 25, 35, or 45 (in degrees), and can also be in the range between any two of the values illustrated here, and more preferably 30 degrees. In other words, the reinforcing portion 75 does not necessarily have to be formed in an inverted "C" shape as shown in FIG. 23B, but may be formed in a "C" shape or straight along the vertical direction.

2. Second Embodiment

FIG. 24 is used to describe the second embodiment of the invention. This embodiment is similar to the first embodiment, with the main difference being that the front part 3 and the back part 4 are provided with one reinforcing portion 75 each. The following explanation focuses on the differences.

In this embodiment, as shown in FIG. 24, one reinforcing portion 75 is provided extending vertically from the opening 24. By using this form, the configuration of the seal bar 27, which applies heat history to the front 3 and back 4, can be made simpler, and the same effects as in the above embodiment can be obtained.

3. Third Embodiment

The third embodiment of the invention is described using FIG. 25. This embodiment is similar to the second embodiment, with the main difference being that the left-right direction of the reinforcement 75 is longer than the vertical direction. The following explanation focuses on the differences.

In this embodiment, as shown in FIG. 25, the reinforcement portion 75 is formed so that the length L7 in the left-right direction is greater than the length H6 in the vertical direction. By using this form, the area of the reinforcing portion 75 in the front portion 3 and the back portion 4 becomes larger, which not only maintains the opening of the opening 7, but also enhances the self-supporting stability of the packaging bag 1.

4. Fourth Embodiment

FIG. 26 is used to describe the fourth embodiment of the invention. This embodiment differs from the above embodiment in that the reinforcement part 75 is not a thermal history mark formed by applying thermal history, but consists of a reinforcement wire 75a and an affixed seal 75b. The following explanation focuses on the differences.

In this embodiment, as shown in FIG. 26, the reinforcing portion 75 is configured by attaching a reinforcing wire 75a along the cut line 24b near the opening 24 of the front portion 3 and back portion 4 in the main part 6 with the attaching seal 75b. This configuration makes it possible to configure the reinforcing portion 75 with a simpler structure, and the same effect as in the above embodiment can be obtained. The material of the reinforcing wire 75a is not particularly limited, and is preferably a plastic member with shape retention properties.

5. Other Embodiments

The reinforcement 75 need not be formed on both the front part 3 and the back part 4, but may be formed on only one of them.

The reinforcement 75 need not necessarily be formed in a line symmetrical manner with respect to the center line H.

The reinforcement 75 does not necessarily have to be formed as a thermal history mark formed by applying thermal history. For example, the reinforcing portion 75 may be formed by simply pressing the sealing bar with the bar not heated to create a crease. In this case, the pressure may be applied from both sides or from only one side.

The reinforcement portion 75 is most preferably provided without separating from the opening 24, but may be provided from a distance downward. In this case, the separation distance should be 1 cm or less.

The reinforcement portion 75 may also be provided in the cut-out portion 5, straddling the opening portion 24.

Fourth Viewpoint

As shown in FIGS. 27 through 31, the packaging bag 1 of this viewpoint is similar to the packaging bags 1 of the first through third viewpoints, and the explanations in the first through third also apply to the packaging bag 1 of this viewpoint, unless contrary to the intent. Although the basic configuration of the packaging bag 1 of this viewpoint is common to the packaging bags 1 of the first through third viewpoints, the packaging bag 1 of this viewpoint may be manufactured using a manufacturing system other than the manufacturing system of the first viewpoint, and it is not essential to have a retracted portion 16 as in the second viewpoint, and it is not essential to have a reinforced portion 75 as in the third viewpoint. It is not essential to have a retraction portion 16 as in the second viewpoint. The following explanation focuses on the differences.

1. First Embodiment 1-1. Configuration of Packaging Bag 1

As shown in FIGS. 27 to 29, a receding portion 85 receding to the upper side is formed in the center of the lower end welding portion 13 in the left-right direction (hereinafter referred to simply as the center portion). The receding portion 85 is formed in a curved shape. Details of the receding portion 85 are described below.

The receding portion 85 is provided at the lower end of the center portion of the packaging bag 1. The receding portion is, in plan view, a portion receding to the upper side with respect to the reference line S along the edge 17 at the lower end of the side portion of the packaging bag 1.

In this embodiment, the receding portion 85 is formed in a curved shape so as to connect the positions of the inner edges of the side end welding portion 12 in the left-right direction. In other words, the center portion in the left-right direction has the longest length in the vertical direction, and the length in the vertical direction gradually shortens as it moves toward the edge in the left-right direction from there. The length L in the left-right direction of the retracted portion 85 corresponds to the length L4 in the left-right direction inside the packaging bag 1. However, it is not limited to this form, and the length L should be $L/L1 \geq 0.5$ relative to the length L1 in the left-right direction of the packaging bag 1. Preferably, it should be $0.9 \geq L/L1 \geq 0.5$. More specifically, the value of $L/L1$ can be 0.5, 0.6, 0.7, 0.8, or 0.9, or it can be in the range between any two of the values illustrated here.

The length H in the vertical direction of the retracted portion 85 should be $H/H1 \geq 0.05$ with respect to the length H1 (see FIG. 28) from the bottom edge of the packaging bag to said opening. Preferably, it should be $0.2 \geq L/L1 \geq 0.05$. More specifically, the value of H/H1 can be 0.05, 0.10, 0.15, or 0.20, or it can be in the range between any two of the values illustrated here. Specifically, the length H should be between 0.5 and 2 cm, and more specifically, the value of H should be one of 0.5, 0.6, 0.7, 0.8, 0.9, 1.0, 1.1, 1.2, 1.3, 1.4, 1.5, 1.6, 1.7, 1.8, 1.9, 2.0 (unit: cm), and may also be within the range between any two of the values illustrated here It can also be in the range between the two, e.g., 1.0 cm.

1-2. Usage of Packaging Bag 1

Referring to FIGS. 30a and 30b, the use of the packaging bag 1 will be described. FIG. 30A shows, as a comparative example, a packaging bag V without the recessed portion 85 at the lower end of the center portion. In FIG. 30A, the length in the front-back direction at the center of the opening 7 is shown by Dp when the packaging bag V is placed on the placing surface with the opening opened.

In contrast, as shown in FIG. 30B, the packaging bag 1 in this embodiment has a recessed portion 85 at the lower end of the central portion, so that when the bag is opened, the load of the contents is applied to the lower end of the central portion with both ends (regions U1 and U2 in FIG. 30B) securely grounded in the left and right directions, and the side end welding portion 12 is The side end weld 12 is inclined inward. As a result, the upper edges of the side end welds 12 (regions M1 and M2 in FIG. 30B) are brought closer together, and the central portion widens back and forth. As a result, the length D1 in the front-back direction at the center of the opening 7 becomes longer than Dp and the opening becomes larger, thus improving user convenience.

2. Second Embodiment

FIG. 31 is used to describe the second embodiment of the invention. This embodiment is similar to the first embodiment, with the main difference being that the recessed portion 85 is trapezoidal in shape. The following explanation focuses on the differences.

In this embodiment, the receding portion 85 is trapezoidal in shape, as shown in FIG. 31. In this case, the same effect as in the above embodiment can be obtained by forming the length L in the left-right direction and the length H in the vertical direction under the same conditions as in the above embodiment.

3. Other Embodiments

The shape of the recessed portion is not limited to the above embodiment, and may be any other shape, such as a triangular shape, for example.

The receding portion 85 may be shaped in line with the lower end welding portion 13. In other words, the recession portion 85 may be formed so that the vertical length of the recession portion 85 is the same at the left and right ends and at the center of the recession portion 85.

Fifth Viewpoint

As shown in FIGS. 32 through 39, the packaging bag 1 of this viewpoint is similar to the packaging bags 1 of the first through fourth viewpoints, and the explanations in the first through fourth also apply to the packaging bag 1 of this viewpoint, unless contrary to the intent. The basic configuration of the packaging bag 1 of this viewpoint is common to the packaging bags 1 of the first through fourth viewpoints, but the packaging bag 1 of this viewpoint may be manufactured using a manufacturing system other than the manufacturing system of the first viewpoint, is not required to have a retracted portion 16 as in the second viewpoint, is not required to have a reinforced portion 75 as in the third viewpoint, and is not required to have a reinforced portion 75 as in the fourth viewpoint. It is not essential to have a receding portion 16 as in the second viewpoint, nor is it essential to have a receding portion 85 as in the fourth viewpoint. The following explanation focuses on the differences.

1. First Embodiment 1-1. Configuration of Packaging Bag 1

As shown in FIGS. 32 to 33, one of the ends of the packaging bag 1 in the left and right directions is provided with a gripping portion 95 for the user to grasp the packaging bag 1. Details of the gripping portion 95 are described below.

The gripping portion 95 is provided on the outside of one of the side end welding portions 12. As shown in FIG. 34a, the gripping portion 95 has a front gripping portion 95a and a back gripping portion 95b. The front gripping portion 95a and the back gripping portion 95b are welded to the bottom portion 2 at the bottom end welding portion 13, respectively.

As shown in FIG. 34b, the gripping portion 95 can be rounded in the inward direction of the packaging bag 1. By gripping the rounded gripping portion 95 in this manner, the packaging bag 1 can be easily gripped even immediately after heating. The rounded gripping portion 95 may be fixed to the body portion 6 with tape or the like.

As shown in FIG. 35, notches R1 are formed at both ends of the bottom film 20a. The length r1 from the center line E of the bottom film 20a to the center of the notch R1 is preferably 1 to 3 cm, more specifically, 1, 1.5, 2, 2.5, or 3 (unit: cm), or it may be in the range between any two of the values illustrated here, such as 2.5 cm. The value can also be between any two of the values illustrated here, for example, 2.5 cm.

The diameter of the notch R1 is preferably 1 to 4 cm, more specifically, 1, 1.5, 2, 2.5, 3, 3.5, or 4 (in cm), and may be in the range between any two of the values illustrated here, for example, 2 cm.

Furthermore, a pair of circular cutouts R2 are formed in the bottom film 20a. The diameter of the cutouts R2 is preferably 1 to 4 cm, more specifically, 1, 1.5, 2, 2.5, 3, 3.5, or 4 (unit: cm), and can also be in the range between any two of the values illustrated here, for example, 2 cm. The diameter of the cutout R2 should be the same as the diameter of the notch R1.

As shown in FIG. 36a, the packaging bag 1 is configured so that at the bottom end of the central portion in the left-right direction (hereinafter also referred to as the central bottom end), it opens wider in the front-back direction than at the bottom end of the side portion in the left-right direction (hereinafter also referred to as the side bottom end). This is because the front and back portions 3 and 4 are directly welded at the notches R1 and R2 (see FIG. 35) formed in the bottom film 20a, and the first fixing portion 15a and second fixing portion 15b are configured to fix the front and back portions 3 and 4 in the front-back direction. Here, the semicircular cutout R1 corresponds to the first fixing portion 15a, and the circular cutout R2 corresponds to the second fixing portion 15b. The center line E of the bottom portion 2 is pulled toward the bottom of the packaging bag 1 as the bottom edge of the center portion opens in the front-back direction.

The length L in the left-right direction of the gripping portion 95 should be $L/L1 \geq 0.1$ relative to the length L1 in the left-right direction at the bottom end of the packaging bag 1. Preferably, it should be $0.3 \geq L/L1 \geq 0.1$, and more specifically, the value of L/L1 can be 0.10, 0.15, 0.20, 0.25, 0.30, or between any two of the values illustrated here. The value of length L should be 2 to 8 cm, more specifically, 2, 3, 4, 5, 6, 7, or 8 (in cm), and may also be in the range between any two of the values illustrated here.

2. Second Embodiment

FIGS. 37 and 38 illustrate the second embodiment of the invention. This embodiment differs from the above embodiment in that the gripping portion 95 is provided at the lower end of the packaging bag 1. The following explanation will focus on the differences.

In this embodiment, as shown in FIGS. 37 and 38, the gripping portion 95 is not formed outside of one side end welding portion 12. And the length of the lower end welding portion 13 in the vertical direction is formed longer than in the first embodiment. In other words, the lower end welding portion 13 functions as the gripping portion 95.

The length H in the vertical direction of the gripping portion 95 should be $H/H2 \geq 0.1$ relative to the length H2 from the bottom end of the packaging bag 1 to the opening portion 24. Preferably, it should be $0.4 \geq H/H2 \geq 0.1$. More specifically, the value of H/H2 can be 0.10, 0.15, 0.20, 0.25, 0.30, 0.35, 0.40, or between any two of the values illustrated here. The value of length H should be 2 to 6 cm, more specifically, 2, 3, 4, 5, or 6 (in cm), and may also be in the range between any two of the values illustrated here.

3. Other Embodiments

As shown in FIG. 39, the side and bottom edges of the gripping portion 95 may be welded and a space 96 may be provided inside. In this case, the space 96 may accommodate tools or other items to be used when eating the contents. By welding the side ends of the gripping portion 95 in this way, the two films of the front gripping portion 95a and the back gripping portion 95b (on the bottom end, four films including the bottom film 20a) can be prevented from flapping. In addition, welding the side edges of the gripping portion 95 facilitates the formation of the tear initiation portion 24a. Since the second fixing portion 15b is formed to penetrate the cutout R2 of the bottom film 20a, it is convenient to weld around the second fixing portion 15b by welding the side end of the gripping portion 95. Also, by welding the lower end of the gripping portion 95, the entire lower end of the packaging bag 1 is welded, and the displacement between the front portion 3 and the back portion 4 can be suppressed in the process of welding the side end welding portion 12 when making the bag.

In the first embodiment, the gripping portion 95 is formed on the outside of one of the pairs of side end welding portions 12. For example, it may be provided on the outside of both of the side end welding portions of the pair of side end welding portions 12.

REFERENCE SIGNS LIST

1: packaging bag, 2: bottom surface portion, 3: front surface portion, 3a: lower front surface portion, 3b: upper front surface portion, 4: back surface portion, 5: tear-off portion, 6: main body portion, 7: opening, 7a: circumferential edge portion, 10: joint portion, 10a: overlapping portion, 11: vapor release seal portion, 12: side-edge welded portion, 13: lower-edge welded portion, 13a: gradient portion, 13b: center portion, 13c: boundary, 14: air pocket, 15: fixed portion, 15a: first fixed portion, 15b: second fixed portion, 16: receding portion, 17: edge, 18: edge, 19: end seal portion, 20a: bottom film, 20b: peripheral wall film, 21: peripheral surface portion, 22: upper-edge welded portion, 24: opening portion, 24a: tear start portion, 24b: tear-off line, 26: cushioning material, 27: seal bar, 30: manufacturing system, 31: film supply device, 32: conveying device, 33: bottom insertion device, 34: bottom sealing device, 34a: seal bar, 34b: cooling bar, 35: transverse sealing device, 35a: first seal bar pair, 35a1: front surface seal bar, 35a2: back surface seal bar, 35b: second seal bar pair, 35b1: front surface seal bar, 35b2: back surface seal bar, 35c: third seal bar pair, 35c1: front surface seal bar, 35c2: back surface seal bar, 35d: fourth seal bar pair, 35d1: front surface seal bar, 35d2: back surface seal bar, 35e: cooling bar, 36: upper portion cutter, 37: cutoff device, 40: peripheral long film, 40a: peripheral long film roll, 40b: turning roller, 40c: former, 40d: joint portion sealing device, 40d1: seal bar, 40e: joint portion cooling device, 40e1: cooling bar, 40f: cutter, 40f1: edge, 42: bottom long film, 42a: bottom long film roll, 42b: turning roller, 42c: former, 42d: punching device, 42e: guide member, 43: front surface long film, 44: back surface long film, 45: transverse seal portion, 46: opening, 50: roller, 51: roller pairs, 52: roller pairs, 53: roller pairs, 54: roller pairs, 75: reinforcing portion, 75a: reinforcement wire, 75b: sticking seal, 85: receding portion, 95: gripping portion, 95a: front surface gripping portion, 95b: back surface gripping portion, 96: space, A: conveyance direction, B: placing surface, C: ring, C1: one end, C2: the other end, D: distance, E: center line, F: opening center portion, G1: side lower end, H: center line, H4: height, IC: insertion completion position, IS: insertion start position, M: non-contact area, M1: region, N1: vicinity region, N2: vicinity region, P: edge, P1: end point, Q: edge, Q1: end point, R: notch, R1: bottom region, R2: cutout, R3: intermediate region, R4: joint region, S: reference line, T: perpendicular line, U1: region, V: packaging bag, Φ: inclination, θ: angle, θ1: angle, θ2: angle

The invention claimed is:

1. A manufacturing system of a packaging bag, comprising:
a film supply device;
a conveying device;
a bottom insertion device;
a bottom sealing device;
a transverse sealing device; and
a cutoff device,
wherein the film supply device supplies a front surface long film and a back surface long film facing each other,
the conveying device is configured to convey the front surface long film and the back surface long film,
the bottom insertion device, the bottom sealing device, the transverse sealing device, and the cutoff device are arranged in this order along a conveyance direction, the bottom insertion device is configured to start inserting a bottom long film between the front surface long film and the back surface long film at an insertion start position and to complete insertion of the bottom long film at an insertion completion position downstream from the insertion start position,
the insertion start position is a position where insertion of the bottom long film between the front surface long film and the back surface long film starts,
the insertion completion position is a position where insertion of the bottom long film between the front surface long film and the back surface film completed,
at the insertion start position, insertion of the bottom long film is made at an oblique angle to the conveyance direction of the front surface long film and the back surface long film,
the bottom sealing device is configured to weld the bottom long film to the front surface long film and to the back surface long film,
the transverse sealing device forms a transverse seal portion extending in a direction perpendicular to the conveyance direction so as to weld the front surface long film and the back surface long film to each other, and
the cutoff device cuts off the front surface long film, the back surface long film, and the bottom long film along the transverse seal portion.

2. The manufacturing system of claim 1,
wherein the bottom insertion device is configured to perform the insertion in a state where the bottom long film is folded in a V shape, and
a distance between the insertion start position and the insertion completion position is 10 or more times longer than W, where W represents a width of the bottom long film in an unfolded state.

3. The manufacturing system of claim 1,
wherein the conveying device comprises a roller pair between the insertion start position and the bottom sealing device, the roller pair being configured to pinch the front surface long film and the back surface long film, and the roller pair is arranged so as not to pinch the bottom long film.

4. The manufacturing system of claim 1,
wherein the front surface long film comprises a joint portion formed by welding an overlapping portion where an inner surface of an upper front surface portion and an inner surface of a lower front surface portion are overlapped in a state that the upper front surface portion and the lower front surface portion are both folded back,
the transverse sealing device comprises a plurality of seal bar pairs configured to pinch and weld the front surface long film and the back surface long film, and
at least one of the plurality of seal bar pairs is configured to pinch a bottom region where the bottom long film is sandwiched between the front surface long film and the back surface long film and a joint region where the joint portion is formed, and is configured not to pinch an intermediate region between the bottom region and the joint region.

* * * * *